(12) United States Patent
Troyer et al.

(10) Patent No.: US 10,835,981 B2
(45) Date of Patent: Nov. 17, 2020

(54) METHOD FOR CIRCUMFERENTIAL WELDING AND A ROBOTIC WELDING SYSTEM FOR CIRCUMFERENTIAL WELDING

(71) Applicant: TECHNIP FRANCE, Courbevoie (FR)

(72) Inventors: Joel Troyer, Houston, TX (US); Gaspard Brisac, Aberdeen (GB)

(73) Assignee: TECHNIP FRANCE (FR)

( * ) Notice: Subject to any disclaimer, the term of this patent is extended or adjusted under 35 U.S.C. 154(b) by 406 days.

(21) Appl. No.: 15/850,739

(22) Filed: Dec. 21, 2017

(65) Prior Publication Data

US 2019/0193180 A1 Jun. 27, 2019

(51) Int. Cl.
| | | |
|---|---|---|
| *B23K 9/028* | (2006.01) | |
| *B23K 37/02* | (2006.01) | |
| *B23K 9/02* | (2006.01) | |
| *C21D 9/50* | (2006.01) | |
| *B23K 37/053* | (2006.01) | |
| *B23K 9/29* | (2006.01) | |

(Continued)

(52) U.S. Cl.
CPC .......... *B23K 9/0286* (2013.01); *B23K 9/0216* (2013.01); *B23K 9/124* (2013.01); *B23K 9/295* (2013.01); *B23K 37/0229* (2013.01); *B23K 37/0533* (2013.01); *C21D 9/50* (2013.01); *B23K 2101/10* (2018.08)

(58) Field of Classification Search
CPC .. B23K 9/0216; B23K 9/0282; B23K 9/0286; B23K 2101/04; B23K 2101/10
See application file for complete search history.

(56) References Cited

U.S. PATENT DOCUMENTS

| | | | | |
|---|---|---|---|---|
| 2,463,907 A | * | 3/1949 | Risley ................. | B23K 9/0286 228/5.1 |
| 3,807,715 A | | 4/1974 | Nelson et al. ................ | 266/5 F |

(Continued)

Primary Examiner — J C Jacyna
(74) Attorney, Agent, or Firm — Ostrolenk Faber LLP

(57) ABSTRACT

A method for automated circumferential welding of a workpiece by means of at least one welding device, including: (a) determining a further weld path for a further weld to be welded on the workpiece, the further weld extending from a start point, via a downstream part to a stop point, (b) determining first welding parameters associated with the further weld and adapted to weld the further weld on the workpiece, the first welding parameters are adapted to transfer a first level of heat to the workpiece, (c) identifying at least one overlap area in the further weld path between the downstream part and the start point of the further weld or between the further weld and a start or stop point of a previous weld, (d) determining a boost area, the boost area including the at least one overlap area, (e) determining boost welding parameters associated with the boost area and adapted to weld the further weld in the boost area, the boost welding parameters are adapted to transfer a second level of heat to the workpiece, the second level of heat exceeding the first level of heat, and (f) welding the further weld from the start point to the stop point thereof, the first welding parameters are selected for welding of the further weld outside the boost area, and the boost welding parameters are selected for welding the further weld inside the boost area.

16 Claims, 18 Drawing Sheets

(51) Int. Cl.
*B23K 9/12* (2006.01)
*B23K 101/10* (2006.01)

(56) References Cited

U.S. PATENT DOCUMENTS

| | | | | |
|---|---|---|---|---|
| 4,145,593 | A * | 3/1979 | Merrick | B23K 9/0286 |
| | | | | 219/60 A |
| 4,283,617 | A * | 8/1981 | Merrick | B23K 9/0286 |
| | | | | 219/125.1 |
| 4,935,029 | A * | 6/1990 | Matsutani | B23K 26/28 |
| | | | | 606/223 |
| 6,737,601 | B1 * | 5/2004 | Kramer | B23K 9/0216 |
| | | | | 219/61 |
| 8,569,651 | B2 | 10/2013 | Lipnevicius | 219/125.11 |
| 10,668,550 | B2 * | 6/2020 | Revel-Muroz | B23K 9/0216 |
| 2006/0213893 | A1 * | 9/2006 | McGushion | B23K 9/093 |
| | | | | 219/137 PS |
| 2009/0032310 | A1 * | 2/2009 | Stevens | B23K 26/32 |
| | | | | 175/435 |
| 2011/0049105 | A1 | 3/2011 | Dupont et al. | 219/59.1 |
| 2016/0093840 | A1 * | 3/2016 | Yoshino | B32B 5/147 |
| | | | | 429/176 |
| 2017/0209950 | A1 * | 7/2017 | Nishimura | B23K 9/173 |

\* cited by examiner

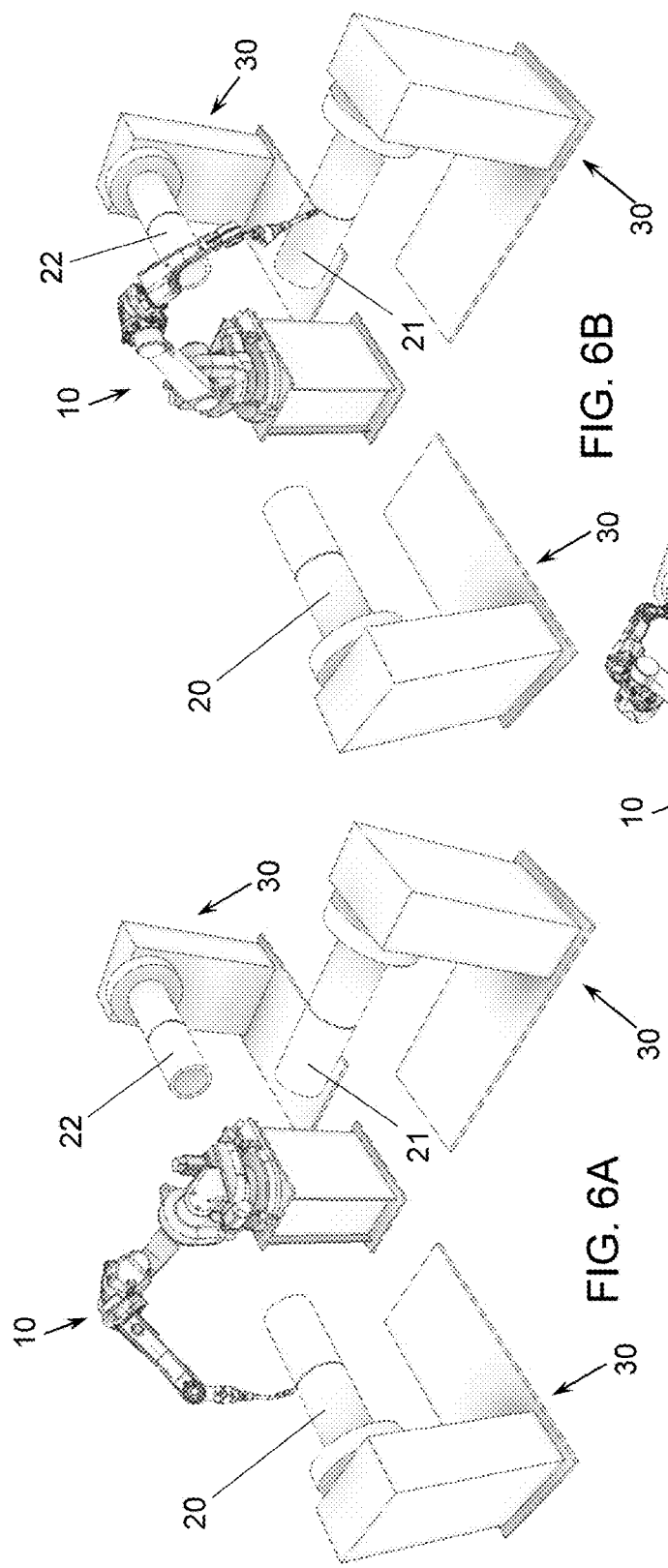

METHOD FOR CIRCUMFERENTIAL WELDING AND A ROBOTIC WELDING SYSTEM FOR CIRCUMFERENTIAL WELDING

BACKGROUND

The use of automatic or mechanized orbital or circumferential welding systems is well known. Typically, these systems increase consistency and productivity of welding operations, when compared to manual welding. Mechanized orbital or circumferential welding systems may include a welding head with an arc welding torch assembly which is manipulated around the circumference of an object to be welded during a welding operation.

Mechanized orbital or circumferential welding systems typically comprise a control program for controlling the movement of the welding head during welding. Such a control program may operate on the basis of preset parameters, such as welding parameters and motion related parameters, or may be manipulated in real time by an operator. The operator may guide the motion, steering, and/or oscillation during the operation as well as the welding parameters.

Mechanized orbital or circumferential welding is, for instance, used for welding two pipes defining a welding path between the opposite ends of the pipes. Typically, the final weld is obtained by a plurality of welding passes to provide sufficient weld volume. A first possibility is to use a single welding system for obtaining the weld. In multi pass circumferential welding of pipeline, two welding systems can be used to perform the girth welding, one on a first side of the object to be welded; one on the opposite side. The use of more than one welding system allows to significantly reduce the time needed to complete a weld.

For all types of welding, the areas that are susceptible for producing a welding defect include the start and stop points of previous welding passes. For instance, for pipeline welding, where two welding systems are used to perform the girth welding, the start point and the stop point of each welding pass occur typically at the 12 o'clock and 6 o'clock positions where the welding arc establishes/extinguishes itself during the welding operation.

Welding on the overlap area between a previously welded pass and a subsequent pass is challenging, due to the somewhat irregular profile of the start and stop areas as well as the ramp up or down of the arc and the weld pool. The irregular profile of the areas increases the risk of producing a welding defect in this overlap area.

To overcome this higher likelihood of producing a welding defect, it is normal practice to have a welding operator to perform a grinding operation to smooth the weld overlap area. This includes effectively removing the somewhat irregular profile from the weld joint, thereby reducing the causes for disturbance of the arc and hence the likelihood of producing a welding defect. The grinding operation can also effectively remove the ramp up portion of the arc initiation phase which often does not immediately penetrate the prior pass with complete soundness. The operator must correctly evaluate the start and stop points as well as perform adequate grinding operations to deposit sound weld metal at start and stop points.

The reliance on the welding operator to control and adjust the welding system for any unforeseen variance of the object to be welded is considered to be an important drawback of the systems used in the prior art. The necessity to obtain the highest level of quality for welds has made the requirements for the operations more difficult which, in some cases are impossible for a welding operator to maintain consistently. Additionally the grinding operation itself is adding to the cycle time and can also lack consistency as this is a manual operation. It should be noted that grinding is a non-value added activity as it delays welding deposition and in fact removes weld volume that will have to be deposited with further weld passes.

The use of robots to perform welding operations is also well known. The main advantage of using welding robots, is that the use of such robots allows to increase the welding productivity and the welding quality. Moreover, the use of welding robots helps to reduce human exposure to harsh and/or undesirable working conditions.

Robotic welding systems may include a robot adapted to move a welding system towards an object to be welded, or workpiece, which is held in a fixed position. The welding system welds the workpiece while moving the object and/or the welding system. A control program controlling the movement of the robot, operates on the basis of certain stored input parameters, such as: the type of workpiece, geometric data of the welding portion, the needed depth of penetration, the start point of the weld pass, the trajectory or weld path and the stop point of the weld pass.

Certain welding conditions which may be considered when creating the control program include: the welding current, the welding voltage, the length of the arc between the welding electrode and the workpiece, the speed of supplying welding consumable(s), as well as a relative velocity of the welding apparatus and the workpiece. In an open-loop control system these welding parameters and robot trajectory parameters are applied without any alteration being available during welding.

The inability to alter the welding process and the robot operations in an open-loop system is considered to be a drawback for at least some types of robotic welding operations. Therefore, robot systems have been designed to include feedback control to allow altering of the welding process during welding. U.S. Pat. No. 8,569,651, hereby incorporated by reference in its entirety, discloses a closed-loop design wherein real-time changes of welding conditions, laser vision capabilities, or electric voltage sensing can be used to alter the weld path and the welding parameters. The drawback of using this known system is that it can only be used when rotating or manipulating the workpiece, this to guarantee that the welding system is always interacting with the object from the top side. In other words: in the known system, the weld pool is kept in essentially a horizontal position. However, in many applications it may be necessary for the welding system to revolve or to orbit the workpiece, which means that the welding system will be used in a plurality of different orientations with respect to the workpiece.

In view of the foregoing problems and shortcomings of known welding systems, the present invention relates to a method and an apparatus to overcome at least part of the mentioned shortcomings and provides an improved circumferential welding method and system.

STATEMENT OF INVENTION

According to one aspect of the invention, there is provided a method for automated circumferential welding of a workpiece by means of at least one welding device, comprising:

a) determining a further weld path for a further weld (n+1) to be welded on the workpiece, the further weld (n+1) extending from a start point, via a downstream part to a stop point,
b) determining first welding parameters associated with said further weld (n+1) and adapted to weld said further weld on the workpiece, wherein the first welding parameters are adapted to transfer a first level of heat to the workpiece,
c) identifying at least one overlap area in the further weld path between the downstream part and the start point of said further weld (n−1) or between said further weld (n+1) and a start or stop point of a previous weld (n),
d) determining a boost area, said boost area comprising said at least one overlap area,
e) determining boost welding parameters associated with said boost area and adapted to weld said further weld (n+1) in said boost area, wherein the boost welding parameters are adapted to transfer a second level of heat to the workpiece, the second level of heat exceeding the first level of heat, and
f) welding the further weld (n+1) from the start point to the stop point thereof, wherein the first welding parameters are selected for welding of the further weld (n+1) outside said boost area, and wherein the boost welding parameters are selected for welding the further weld (n+1) inside said boost area.

It should be noted that the order of the mentioned steps of the method can be altered. For instance, it is possible to determine, according to step e) a boost interval, prior to determining first welding parameters according to step b).

According to a second aspect of the invention, there is provided a welding system for circumferential welding of a substantially circular workpiece, the welding system comprising:
a work position for receiving a workpiece,
a welding head,
a weld arm for allowing respective movement of the welding head along a weld path with respect to the workpiece during welding, the welding head being connected to said weld arm,
a power supply for providing power to the welding head during welding and for providing power to move the weld arm and/or the workpiece to allow respective movement of the welding head with respect to the workpiece,
a control system for controlling welding parameters for the welding head during welding and for controlling the respective movement of the welding head and the workpiece,
wherein the welding system is adapted to perform at least a further weld (n+1), the further weld (n+1) extending along a weld path from a start point to a stop point,
wherein the control system is adapted to determine a start position for said further weld (n+1) offset from the start point and/or stop point of a previous weld (n), and wherein the control system is adapted to:
  determine a further weld path for a further weld (n+1) to be welded on the workpiece, the further weld (n+1) extending from a start point to a downstream stop point,
  select first welding parameters for welding said further weld (n+1), the first welding parameters being adapted to transfer a first level of heat to the workpiece,
  identify at least one overlap area in the further weld path between the start point of said further weld (n+1) and a downstream part of said further weld (n+1) or between a start or stop point of a previous weld (n) and a part of said further weld (n+1),
  determine a boost area, said boost area comprising said at least one overlap area,
  select boost welding parameters adapted to weld said further weld (n+1) in said boost area, wherein the boost welding parameters are adapted to transfer a second level of heat to the workpiece, the second level of heat exceeding the first level of heat.

According to a third aspect of the invention, there is provided a welding station comprising a support for rotatably positioning a substantially circular workpiece to be welded and a robotic welding system for circumferential welding of a substantially circular workpiece according to the invention.

According to a fourth aspect of the invention, there is provided a computer program product comprising a computer-readable storage medium having encoded thereon computer-readable instructions, which, when executed in a computer cause the computer to perform each of the method steps of the invention.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIGS. 6a, 6b and 6c are perspectives views of a robotic welding system according to the invention, wherein a single robotic welding system is used in combination with multiple workpieces positioned around the robotic welding system;

DETAILED DESCRIPTION OF THE INVENTION

Figure 1:
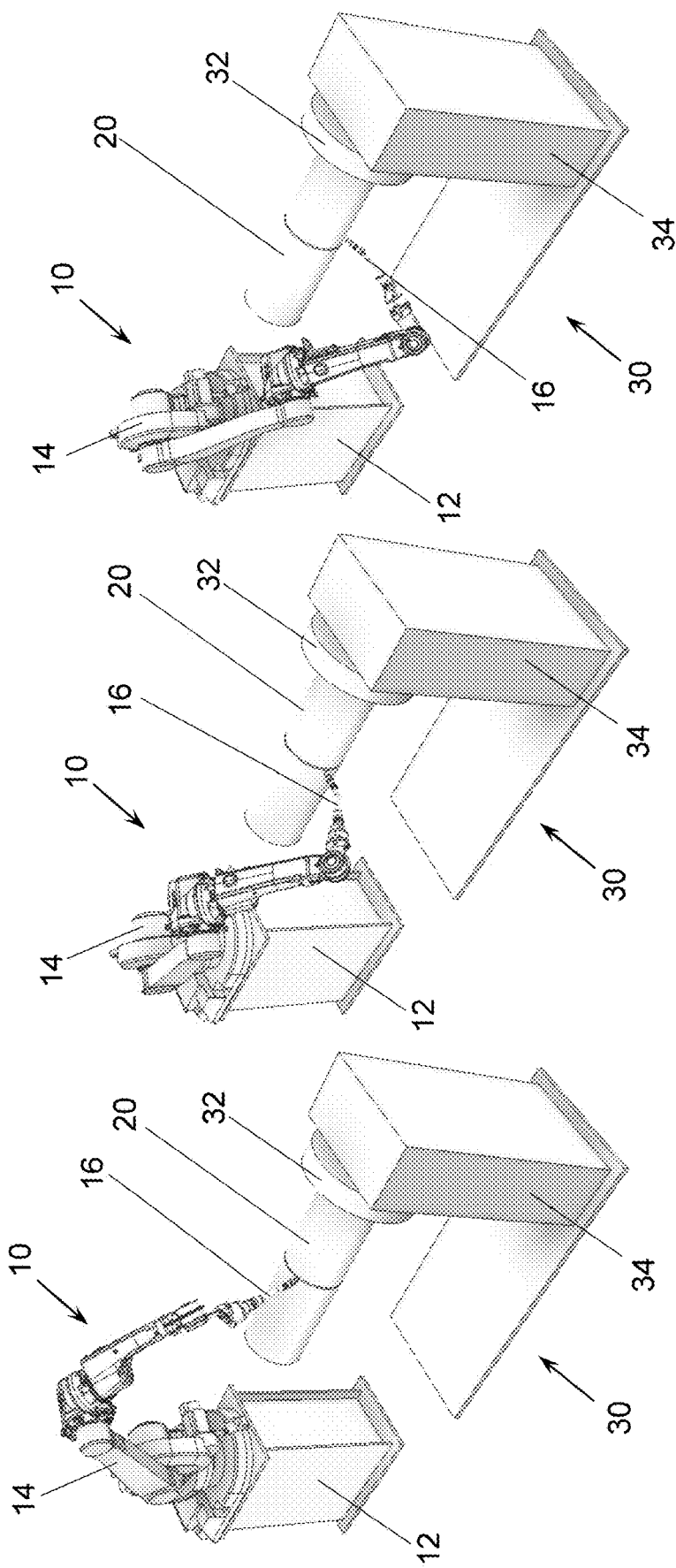
FIGS. 1a, 1b and 1c are perspectives views of a first embodiment of a robotic welding system according to the invention used in combination with a workpiece maintained in a horizontal or near horizontal position, showing the progression of motion about the workpiece.

Referring now to the drawings, the use of a welding system according to the invention, or the use of a combination of multiple welding systems is described in more detail. In the description specific reference is made to the use of the robotic welding systems for welding the opposite ends of two pipes. It should be understood that the description to the drawings is made for the purpose of illustrating the preferred embodiments of the invention only, and not for the purpose of limiting the same.

It is specifically noted that the invention is not limited to robotic welding systems as shown in the drawings. The invention can also be used advantageously with an orbital carrier traveling on a band. Such systems are known as 'bug and band' systems. Such a bug and band system is, for instance shown in U.S. Pat. No. 3,807,715. Alternatively, the advantages of the invention could be used when using an orbital carrier travelling on a ground fixed structure, such as disclosed in, for instance, US 2011/0049105.

In the present description the wording 'workpiece' is used to refer to an object to be welded. The wording 'workpiece' refers, for instance to an assembly of a first and a second pipe defining a welding path between the opposite ends of the pipes.

In the present description reference is made to 'first welding parameters' and to 'boost welding parameters'. The 'first welding parameters' are applied when moving a welding head along a welding pass from a start point to an end point, taking into consideration the parameters of the workpiece and the parameters of the weld to be obtained. The wording 'boost welding parameters' refers to parameters which allow the welding system to transfer an increased amount of heat to the workpiece, when compared to the heat transferred during the application of 'first welding parameters'. The increased amount of heat can be obtained by altering the welding current and/or the welding voltage, the length of the welding arc (by altering the distance between the welding electrode and the workpiece, for instance, by altering the speed of supplying welding consumable(s) towards to workpiece) or by altering the relative velocity of the welding apparatus and the workpiece.

In the present text reference is made to the possibility to alter 'the amount of heat transferred to the workpiece'. In welding procedures using a consumable, for a given amount of heat, part of the heat will be used to melt the welding consumable and another part will be used to melt the workpiece. When, in the text reference is made to 'increasing the heat transferred to the workpiece', it should be noted that this also includes changing the ratio between the heat available for melting the consumable and the heat available for melting the workpiece in order to change the distribution of the heat to have a larger portion of the heat available for melting the workpiece.

In circumferential welding the amount of heat available for melting the workpiece can also be increased by altering the relative angle between the welding electrode and the workpiece during the circumferential movement of the welding head around the workpiece. The ratio between the heat available for melting the electrode and the heat available for melting the workpiece will depend on the orientation of the torch (leading or trailing, respectively)

It should be noted that the above mentioned welding parameters can be used independently, or in combination, to obtain an increase of the heat transferred to the workpiece, which means in the current text, an increase of heat available for melting the workpiece.

In welding operations, the current is generally delivered according cycles, generally of 5 ms to 100 ms. Those cycles comprise current variations including a "peak current". These current variations can typically be current pulses. The "nominal peak current" is typically 280-300 A. According to the invention, the boost welding parameters will typically consist in altering the "peak current" between +20% to +100%, preferably between +20% and +50%, with more preference between +25% and +35%. It should be noted that when applying the boost welding parameters, the alteration of the peak current can be done every cycle, every 2 cycles, or every 3 cycles, etc. Preferably, the peak current alteration is done every 5 cycles. The boost welding parameters can also consist in altering the number of current pulses, the amplitude of one or more current pulses, and the period of one or more current pulses.

The same observations apply for the welding voltage. The welding voltage is typically associated with cycles. In welding procedures the 'nominal peak voltage' used can be typically 22V. According to the invention, boost welding parameters can be obtained, by altering the peak voltage between +20% to +100%, preferably between +20% and +50%, with more preference between +25% and +35%.

In the present description, the wording "weld path" is used to refer to the trajectory of the welding heads during welding.

In the present description, the wording "weld pass" is used to refer to a single progression of welding on a workpiece. The result of such a weld pass is a weld bead or weld layer.

In the present description, reference is made to "a weld head". The wording "weld head" is used to refer to the part of a welding system adapted to create an arc between the welding system and the workpiece. The weld head typically comprises an electrode, for instance, in the form of a consumable electrode, such as a consumable welding wire. The weld head is further adapted to connect the electrode, depending on the welding process used, to an appropriate power source for providing electrical energy and is typically adapted to provide gas shielding of the welding process, if needed.

In the present description reference is made to welding and welding operations. It should be noted that the invention is adapted for a variety of welding processes and can be used for a variety of materials, including metals and thermal plastics. The welding processes for welding metal, for which the present invention is adapted, include, for instance, Shielded Metal Arc Welding (SMAW), Gas Tungsten Arc Welding (GTAW), Gas Metal Arc Welding (GMAW), Submerged Arc Welding (SAW), and Flux Cored Arc Welding (FCAW).

A first embodiment of the present application is directed to a method and system used to weld a cylindrical workpiece. In such a method and system, a substantially cylindrical workpiece is placed in close proximity of a welding device, such as a welding robot. In case of using a robotic welding system, the robot locates the relevant features of the cylindrical workpiece at the position where welding is to be performed. Then a welding operation is performed by using a welding system carried on a robot arm in accordance with a determined control program, taking into account the position and orientation of the cylindrical workpieces. The welding system parameters and robot trajectory parameters are adjusted or maintained based on feedback systems utilized during the operation.

In accordance with an aspect of the present application, a welding system is used having a robot controller, wherein a control program for performing a welding operation, is one of a plurality of control programs stored in said robot controller. The plurality of control programs typically correspond to different sizes or types of workpieces to be welded.

In accordance with an aspect of the present application, the control programs corresponding to different sizes of the workpieces include different welding speeds at which the welding process proceeds. The control programs could, according to a further aspect of the present application, be adapted to manipulate the orientation of the welding electrode with respect to the workpiece during the welding operation.

In accordance with yet another aspect of the present invention, the workpiece may be positioned such that a single welding system, such as a welding robot, could interact with a plurality of cylindrical workpieces, wherein each cylindrical workpieces could have an individual orientation, different from the orientation of the other workpieces. Additionally, a plurality of welding systems, such as welding robots could be used in combination with a single cylindrical workpiece.

Now making reference to the drawings, FIGS. 1*a*, 1*b*, 1*c*, 2, 3, 4, 5, 6*a*, 6*b*, 6*c*, 7*a*, 7*b*, and 8 illustrate the use of a robotic welding system 10, or the use of a plurality of robotic welding systems 10, to perform a welding operation for a single workpiece 20, or a plurality of workpieces 20. In the drawings, each workpiece 20 is supported by means of a workpiece support assembly 30.

As illustrated in FIGS. 1A, 1B, 1C, 3, 4, 5, 6A, 6B, and 6C, the workpiece support assembly 30 comprises a clamp or chuck element 32. The workpiece support assembly 30 can further comprise a pedestal 34, to fix the workpiece support assembly 30 to a support.

The workpiece 20 may include a plurality of the cylindrical objects which are, for instance, tacked together by a pipefitter or are held together by an internal clamp (not shown) to maintain the proper alignment and distances, during a welding operation and during the progression of the robotic welding system(s) 10. For example, if the workpiece 20 comprises two pipe ends, and the weld groove geometry initially is a closed gap weld joint, the ends of the pipes will be brought into an abutting relationship.

Figure 7B:
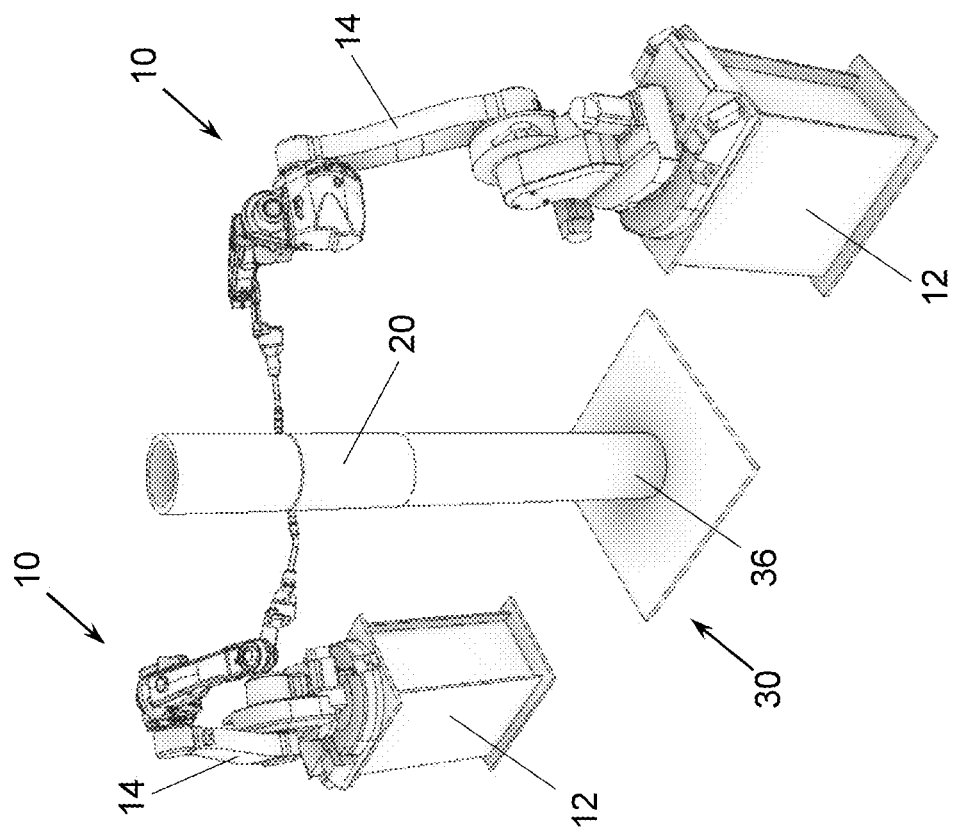
FIG. 7b is a perspective view of a first and a second robotic welding system according to the invention, wherein the two robotic welding systems are used in combination with a single workpiece positioned in the vertical or near vertical position.
Figure 7A:
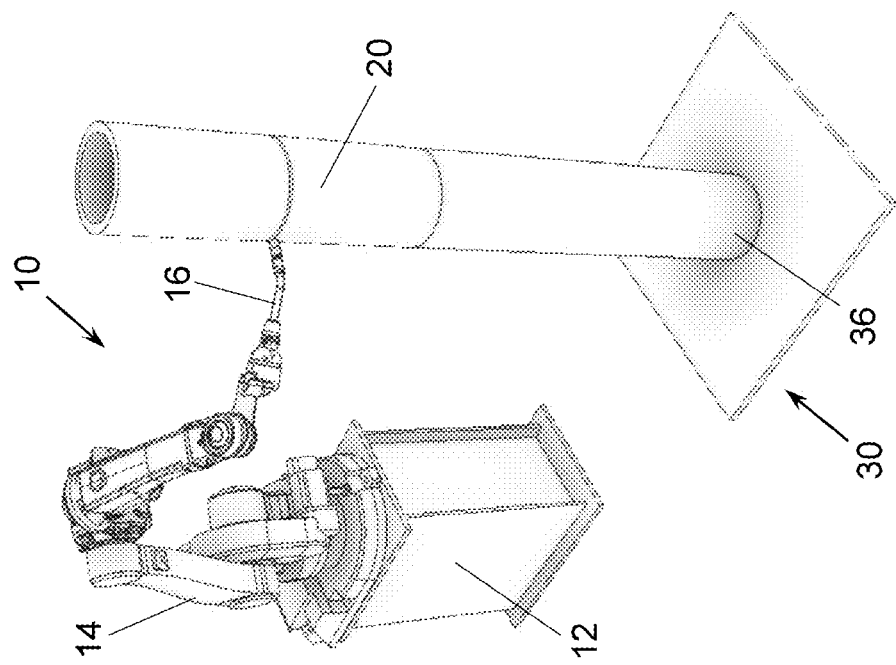
FIG. 7a is a perspective view of a robotic welding system according to the invention, wherein the robotic welding system is used with a workpiece positioned in the vertical or near vertical position.

As illustrated in FIGS. 7A and 7B, workpiece 20 may be supported in a vertical or near vertical direction by means of a support stand 36. Moreover, the workpiece 20 may be fixed to the stand by means of prior mentioned tacking or an internal or external clamp (not shown). All mentioned concepts for maintaining alignment and distance during welding are well known in the art.

Figure 2:
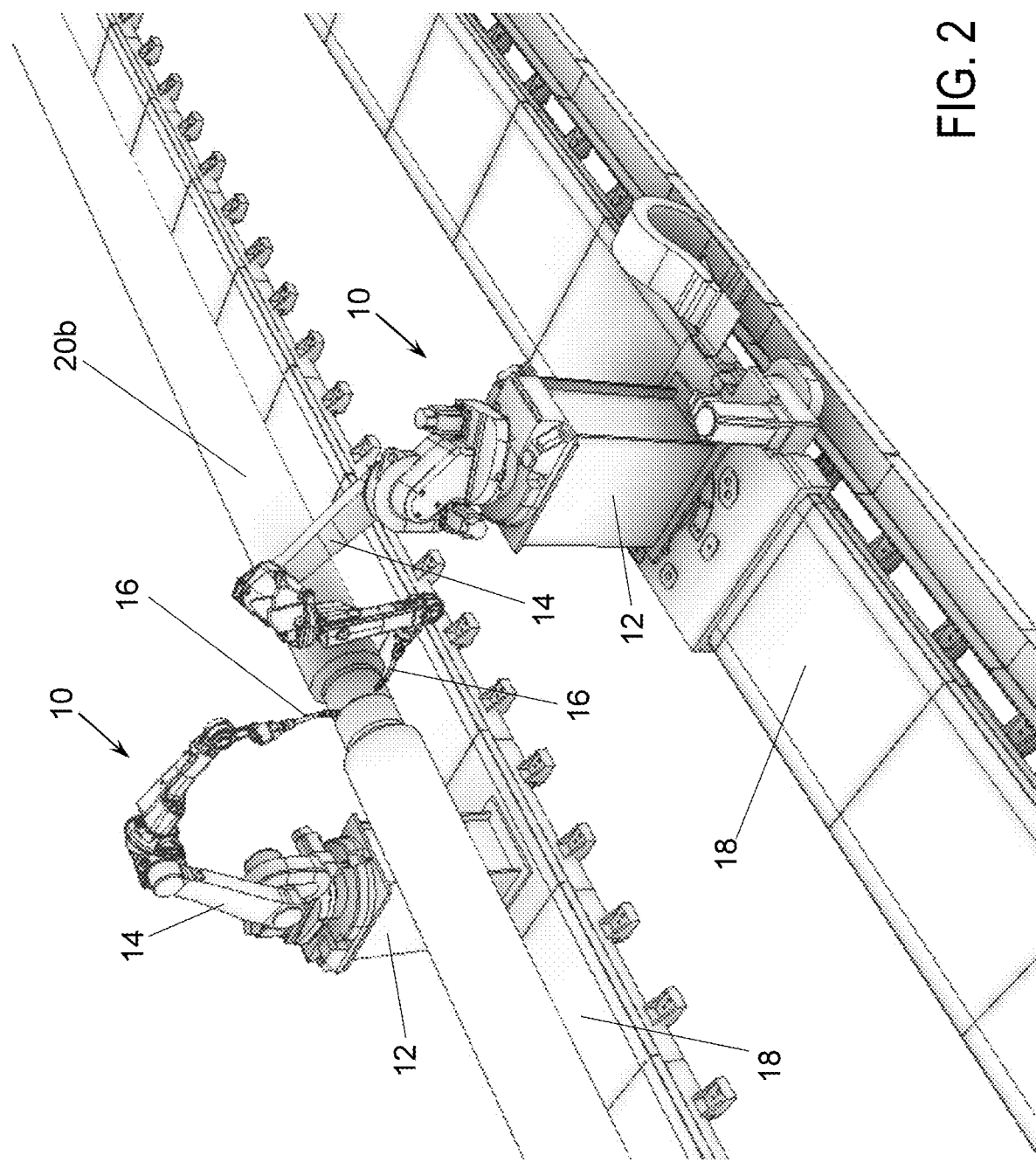
FIG. 2 is a perspective view of a first and a second robotic welding system according to the invention, incorporating a track system for a continuous cylindrical workpiece wherein the two robotic welding systems are used to perform a welding operation around the circumference of the cylindrical workpiece.
Figure 3:
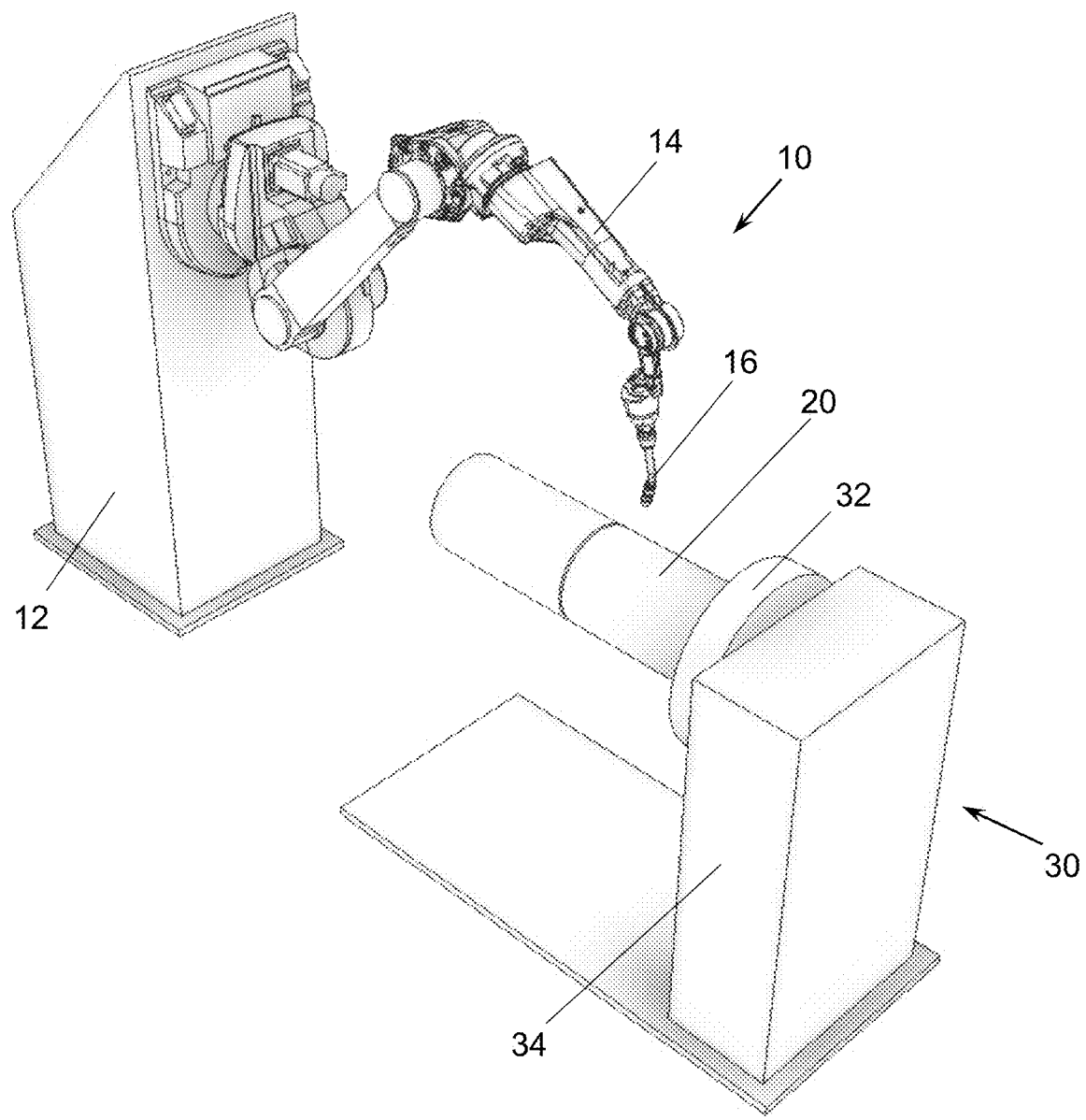
FIG. 3 is a perspective view of a robotic welding system according to the invention, having a wall based mounting.
Figure 4:
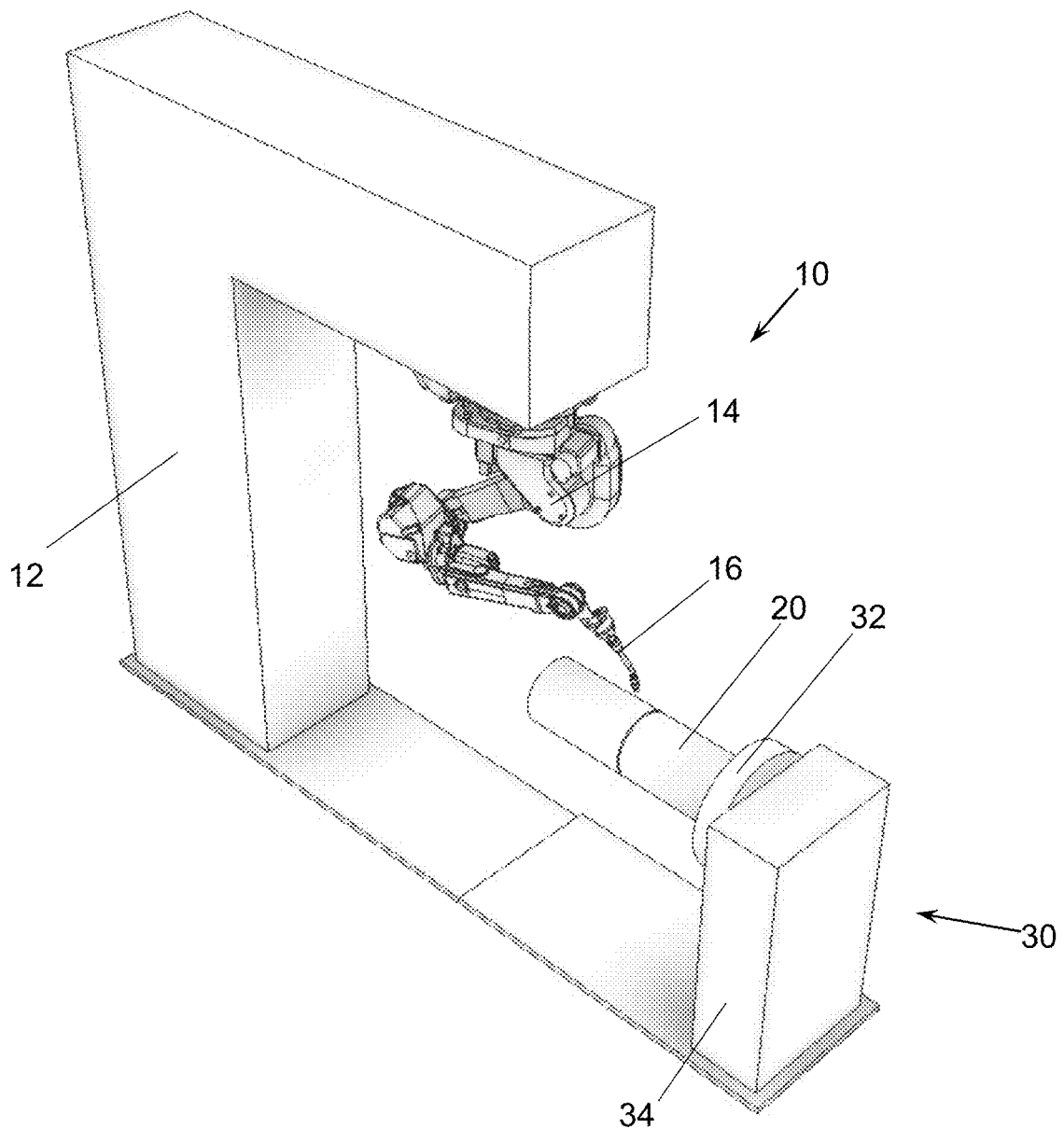
FIG. 4 is a perspective view of a robotic welding system according to the invention, utilizing a ceiling based mounting.
Figure 5:
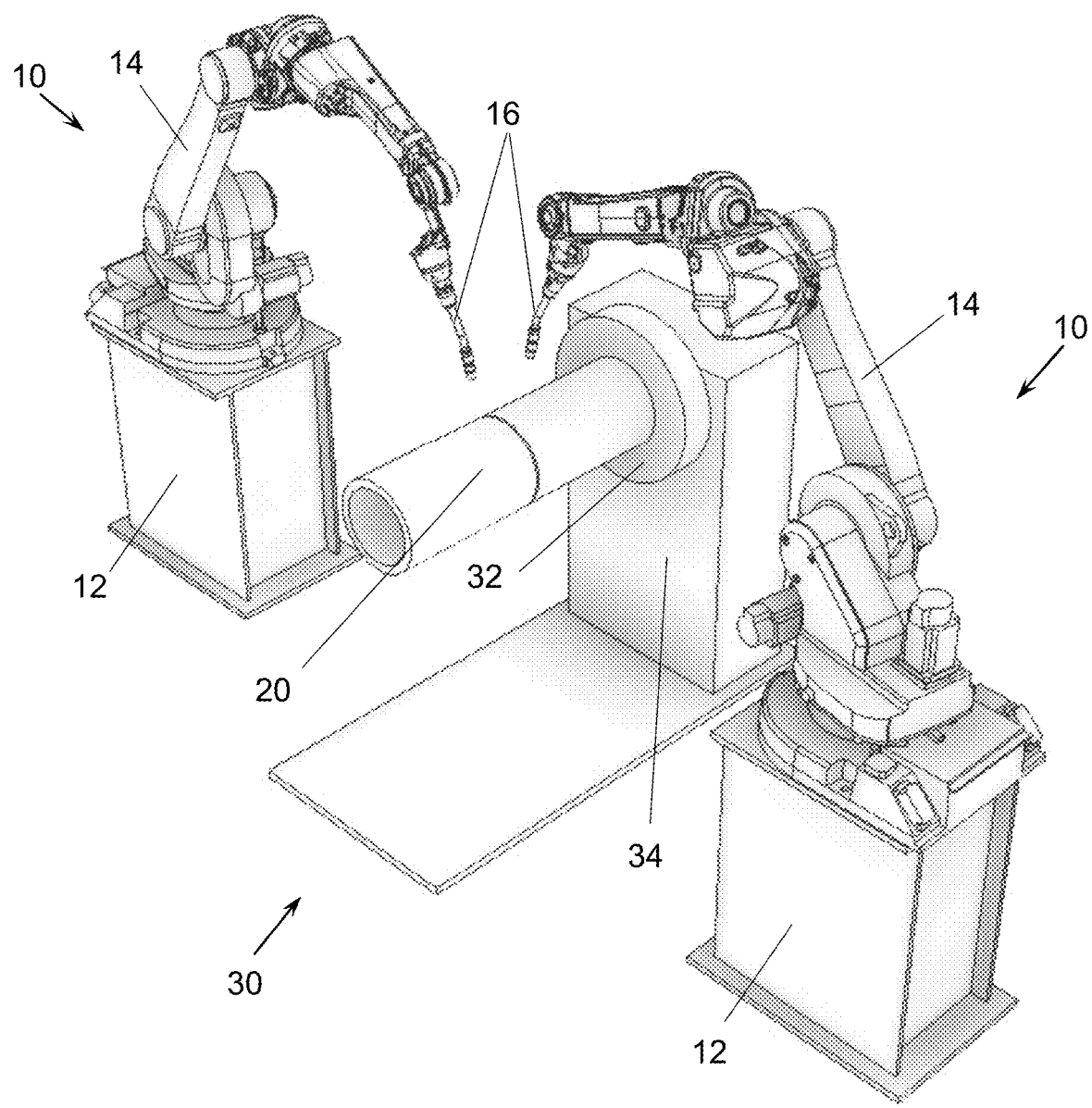
FIG. 5 is a perspective view of a first and a second robotic welding system according to the invention, having a wall based mounting and used in combination with a single workpiece.
Figure 8:
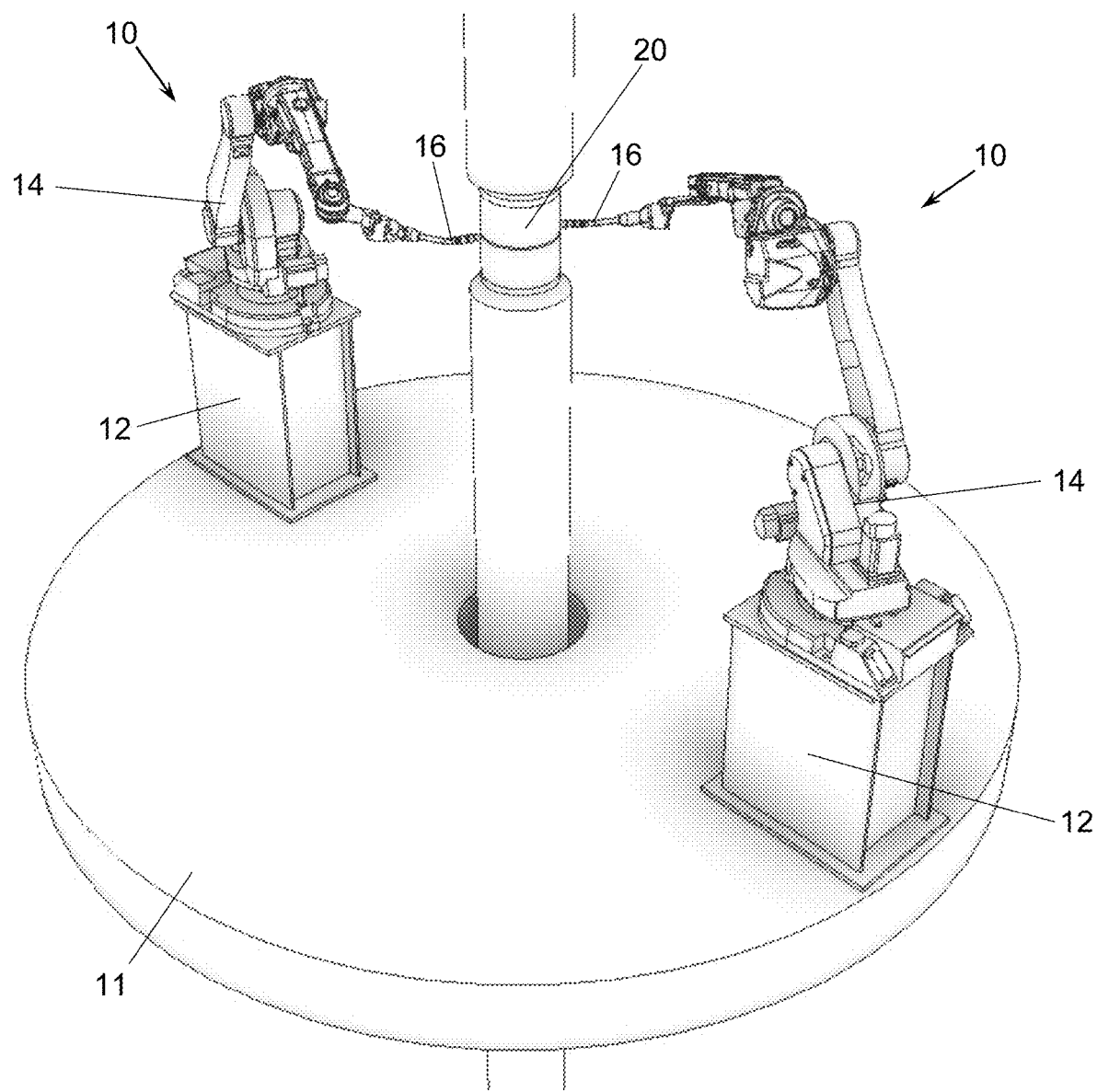
FIG. 8 is a perspective view of a first and a second robotic welding system according to the invention, wherein the robotic welding systems are mounted on a turn table or carousel apparatus on opposite sides of a workpiece positioned in the vertical or near vertical position.

As illustrated in FIGS. 2 and 8, workpieces 20*b* may be long in length and continuous or near continuous and may be supported by means of appropriate supporting means. For example, if the workpieces are pipe stalks or pipe joints the support may have the form of external structures which are available in a facility or on a vessel where the welding operation is performed.

As illustrated in FIG. 2, the arrangement of two robotic welding systems 10 on rails 18, allow the robotic welding systems to be moved, manually or automatically to a position necessary for a welding operation. For manual movement, an operator disengages one or more locking or clamping mechanisms (not shown) and slides the robotic welding systems to an appropriate position for welding. An automatic movement of the robotic welding systems 10 may be achieved by using a motor arrangement and a control system comprising peripheral or robot mounted sensors (not shown).

Sensors can be used to inspect the bevel profilometry of the workpiece. The data relating the bevel, obtained by means of the sensors can be used to computationally reconstruct the bevel profilometry. The sensors can capture the complete profile of interest or only critical break points thereof, such as the bevel top corner. Using the reconstructed bevel profilometry, a general controller of the welding device can adjust the position of the welding head relatively to the bevel. Sensors adapted for this purpose include: laser line trackers, 3D laser trackers, optical cameras, or any other suitable means. The quality of the welding head positioning with respect to the workpiece is increased by using additional data obtained by similar sensors in previous partial or total inspection of the workpiece prior to the welding operation.

In case of pipe welding, the pipe joint geometry can be inspected before the pipes, ready to be welded, are joined to a pipe stalk. In particular, data relating the profile of the pipe joint end can be used to adapt the radial position of the welding head to possible detected geometrical defects, such as ovality. Such data can also be used to ensure, before the welding operation, proper alignment between the pipe joined to be welded and the pipe stalk on which the pipe joined has to be welded.

With continuing reference to FIG. 2, in one embodiment the robot arm 14 of the robotic welding system 10 has itself six axes of movement, including movement in the x, y and z direction and the yaw, roll and pitch movements. Robots of this type are known in the art. However, the integration of the robotic welding system 10 in the rail system 18 provides a seventh axis of movement. Thus, the rail system 18, provides a seventh axis of movement to the robot arm 14, which increases the available work space for the robotic welding system 10 connected to robot arm 14.

According to FIG. 2 the workpiece 20 is positioned within the range of the robot arm 14 of robotic welding system 10. The robotic welding system 10 includes a welding head assembly having a welding head or torch 16. A welding head assembly typically comprises a single torch 16, however it is possible that a welding head assembly comprises a plurality of torches, such as two torches. Welding head 16 comprises a welding assembly which supplies gases, an electrode and/or a welding flux to welding head 16. Welding head 16 is attached to the end of the robot arm 14, which is adapted to move welding head 16 to, from and around workpiece 20.

The robotic welding system 10 according to FIG. 2 is fixed on the pedestal 12, which allows the welding system to be connected to the floor. The robotic welding system 10 comprises a power supply (not shown) to supply electrical power to robotic welding system 10. The robotic welding system 10 further comprises a robot controller (not shown) to control the movements of the robot arm 14. Moreover, a control station or system interface (not shown) is present which includes, among other elements, a data entry section, a start button, a manipulation refinement position control mechanism, such as a touch panel interface (not shown) or a teach pendant (not shown) to manually position the robot arm 14. In a possible embodiment, the data entry section may include a programmable logic controller or a similar device which will accept data inputs. The teach pendant, if present, can be used as a manual data entry input device. The mentioned components, further including a motor/gear arrangement, a robot arm motor/indexer, the welding head 16 and robot controller, are connected to each other via known wire connections (not shown) and/or wireless, using a radio frequency (RF) design. The electrical power needed for operating the mentioned elements of the robotic welding system 10 is supplied using well-known cable arrangements.

It is to be appreciated that while FIGS. 1A, 1B, 1C, 2, 3, 4, 5, 6A, 6B, 6C, 7A, 7B, and 8 illustrate a specific arrangement of the use of the robotic welding system 10, the robotic welding system 10 may be configured using different arrangements which are equally applicable to the concepts of the present application.

Figure 9A:
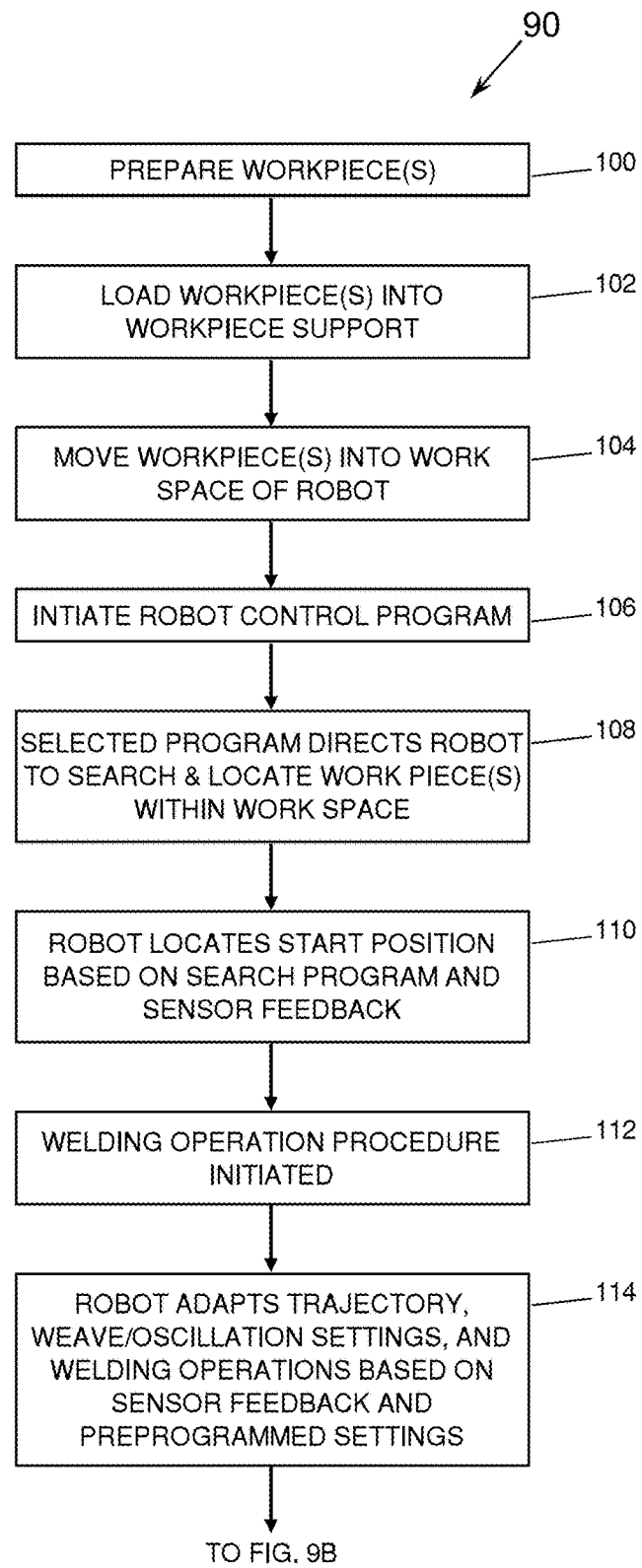
FIGS. 9a and 9b show a flowchart for manipulator control of welding system in accordance with the present application.
Figure 9B:
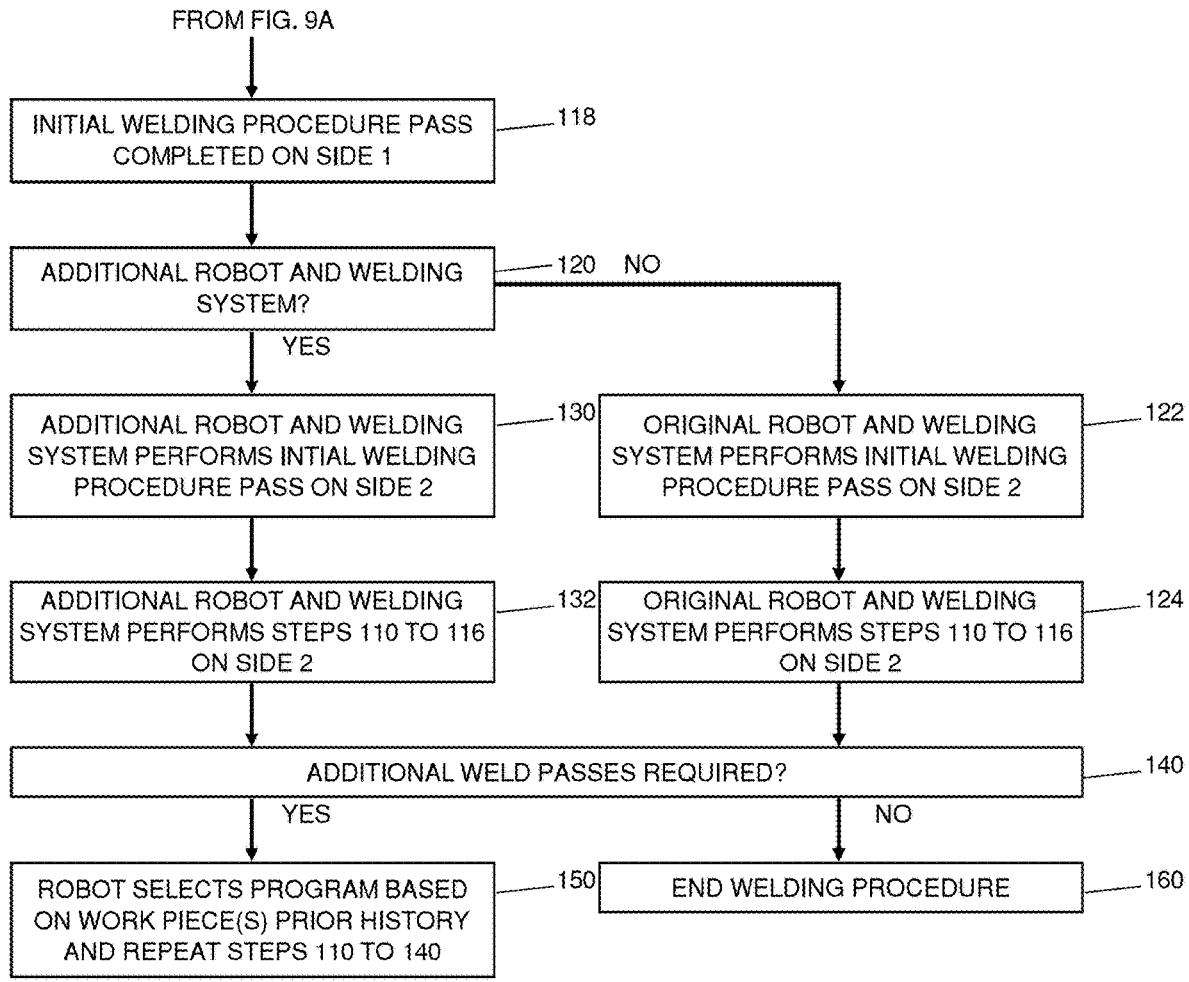

The operation of robotic welding system 10 will now be described in more detail with continuing reference to the FIGS. 1-8 and with additional reference to flowchart 90 as shown in FIGS. 9A and 9B.

According to the flowchart, in a first step 100, a workpiece 20 is prepared. In a next step 102 the workpiece 20 is loaded into a workpiece support, such as the workpiece support assembly 30. The workpiece 20, such as tubes, pipes, tanks, cylinders, columns, or other, may be manually and/or automatically loaded into the workpiece support assembly 30. The weldable material of the workpiece will generally comprise a metal. It should be noted that the described welding system and process are also adapted for other weldable material, including weldable plastics and ceramics or any combination of such weldable materials.

According to a following step 104, once the workpiece 20 has been securely fixed, the workpiece 20 is moved within the welding area of a robotic welding system 10. This step can comprise moving the robotic welding system 10 to a position to allow the welding operation to be performed. The aim of the step is to allow the area to be welded to be within the range of operation of robot arm 14. The movement between the workpiece 20 and the robotic welding system 10 can be manual, or can be assisted by means of a motorized transport system, as would be known to one of ordinary skill in the art.

Once the workpiece support is at its appropriate position, the robot arm 14 is moved to a start position, or if the start position does not change, the previous position of the robot arm 14 is maintained. Thereafter, according to step 106, a selected robot control program or a template control program is initiated to control the operation of the robot arm 14. The robot control program instructs the robot arm 14 to locate the workpiece 20 via sensors (not shown), in accordance with step 108. For example, when the welding operation is adapted to weld a pipe joint, the movement of the robot arm 14 will be in a horizontal direction until the sensor senses a beveled portion of a part of the workpiece 20 to be welded. Once the beveled portion is identified and located via sensor feedback, in accordance with step 110, the welding head 16 is moved to a position to start a welding operation. According to the invention, in case the workpiece 20 is in a horizontal or near horizontal position, this starting position is preferably located at a position of the workpiece 20 between the 10 o'clock and the 2 o'clock position.

Once the welding head 16 is properly positioned, according to step 112, the control program initiates the welding operation (e.g., an arc weld is struck).

Thereafter, the robotic welding system 10 is controlled to move the welding head 16 in an appropriate manner for the intended welding application. For example, when a welding operation is performed, the robot arm 14 will move the welding head 16 in a weaving pattern as is well-known in the art. As described in step 114, during the movement and weaving or oscillation, the welding operation, the robot movement, and/or oscillation settings may be adjusted based on sensor feedback and/or preprogrammed settings 114.

The use of robot arm 14 to move the welding head 16 further allows optimization of the welding parameters. In particular, the relative angle between the workpiece 20 and the welding head 16 can be altered to adapt to the circumferential position of the welding head 16 and thus optimize the weld quality. Typically, the push or pull (travel) angle can be dynamically selected in a range of +/−45°. For example, when a welding operation is performed on a circular workpiece 20 positioned in a horizontal or near horizontal position, the relative angle between the workpiece 20 and the welding head 16 may vary significantly between the 12 o'clock and the 6 o'clock positions. Additionally, in the example of pipe welding, variance in pipe wall thickness, inner diameter ovality or out-of-roundness, and/or bevel dimensions may require the welding parameters, including the parameters relating to the relative angle between the workpiece 20 and the welding head 16 to be adjusted during the welding operation to produce a sound weld. The possibility to alter the relative angles between the welding head 16 and a workpiece to optimise the weld quality is further explained below with reference to the example according to FIGS. 15 and 16.

The welding operation continues until an initial welding pass has been completed, as mentioned in step 118. In the example of pipe welding, the welding pass often equals half the circumference or nearly 180° of the cylindrical workpiece. In case of using a single robotic welding system 10, the next step is that the original robotic welding system 10 completes the initial welding pass on the opposite side of the workpiece, as described in steps 122 and 124.

Alternatively, in case multiple robot weld systems 10 are used, a second robot weld system 10 may weld the opposite side of the workpieces subsequently to or simultaneously with the welding operation at the first side of the workpiece, as described in steps 130, 132.

In the following step 140, it is determined whether an additional welding pass is required. It is possible that this decision is made by the control program which may be supplemented with information from sensor feedback. If additional welding passes are necessary in the current work station, steps 110-140 are repeated according to step 150. When it is determined that no further welding passes are needed, the procedure ends with step 160.

If it is determined that an additional welding pass is required, the welding head 16 is moved to a start position, to allow the start of a subsequent welding operation in accordance with step 110. According to the invention the new starting position for a subsequent welding pass may be at a determined distance from the initial start point or stop point of a previous welding pass. It is noted that during the previous welding pass, the depositing of the weld material has for effect a decrease of the depth of the weld area. This decrease is typically in the order of 2-4 mm, but can be as high as 5 mm for more advanced welding processes. Therefore, when moving to a new starting position, the welding head 16 is pulled back a sufficient distance from the workpiece 20 to allow a proper welding operation to commence.

According to the invention, the new starting position for a subsequent welding pass is chosen to be at a determined minimum distance from the initial start point or stop point of a previous welding pass. This minimum distance is chosen to ensure that the start and stop points of subsequent welding passes are not layered on top of each other, which could be prone to defects. In one embodiment, the determined distance between a previous start or stop point and the subsequent start position is at least 10°. This means that the subsequent start position will be 10° distanced from the previous start or stop point.

According to a further embodiment the determined minimum distance between a previous start or stop point for a welding pass (n) and the subsequent start point for a subsequent weld pass (n+1) is between 10° and 20°.

It should be noted that the subsequent steps described in connection with flowchart 90 may be processed in an order other than as presented therein or processed in partial form. For example, the robotic welding system 10 may initiate a specific welding operation on an additional workpiece prior to completing a previous workpiece. Further, in a pipe stalk manufacturing facility or a series of robotic welding systems may be used in which pipe joint workpieces are brought into subsequent work spaces for robotic welding systems 10 each for a specific welding operation. It is to be understood the foregoing is presented as an example, and the order of other steps may also be altered. It is to be appreciated that the flowchart according to FIGS. 9A and 9B is considered to be applicable to alternative welding procedures other than pipe joint welding.

With more particular attention to step 114, in one embodiment, a series of welding processes, robot movements, and oscillation/weave parameter settings may be stored for various workpiece sizes, circumferential positions, weld joint geometry depths, and weld joint geometry widths. As an option during configuration of the robot control program, feedback from sensor(s) may direct, different robotic welding system parameter settings to be executed during welding operations based on the feedback values. In this example, the robotic welding system would adapt the robot movement and welding system to conform to the specific workpiece undergoing the welding operation. A system operator may program the robotic welding system to adapt fully, adapt partially, or disable adaptation. The operator may employ a single weld program for all passes or a set of weld programs for each subsequent weld pass depending on the workpiece application range(s).

The technical effect of selecting a determined distance between a subsequent start point and a previous start and stop point is to facilitate the avoidance of so-called start and stop defects which are due to somewhat irregular profiles experienced at those start and stop locations. For the present invention, the robotic welding system 10 is adapted to know or sense the location of those start and stop locations, and effectively move the welding head 16, prior to starting the welding program for a subsequent welding pass (n+1), to a pre-determined position with respect to the known or sensed previous start and stop positions.

According to the present invention, the robotic welding system 10 is provided with a control system (not shown) for controlling the welding parameters and controlling the movements of the robot arm 14 during welding. According to a first embodiment of the invention, it is possible that the control system is provided with or is connected to a memory for storing the start point and the stop point for each welding pass. That means that the control system can use the stored start and stop points for a previous weld pass (n) to determine an appropriate start point for a subsequent weld pass (n+1), taking into account the determined minimum distance between said stored previous start and stop points and the subsequent start point for a subsequent weld pass (n+1).

According to an alternative embodiment of the invention, the robotic welding system 10 can be provided with an adapted sensor, to sense the surface of the workpiece to thereby identify the location of the start and stop points of a previous weld pass (n).

According to an embodiment of the invention, the start and stop point of a previous weld are defined as corresponding to the welding areas where the depth measurement difference within an angular displacement inferior to 5°, between the respective deepest point in the area and the least deepest point in the same area, is superior to 1.5 mm. The start and stop position of the previous weld can be known by knowing the specific movement and specific use of the welding head when welding said previous weld. This information relating to the specific details of the previous weld can be stored in a memory present in or associated with the welding system. In case of robotic welding this information can be shared by different robots or can be transferred from a first to a second robot by means of an adapted communication protocol, in case subsequent welding passes are obtained by using different robots.

In case of robot welding, it is possible to obtain detailed information of the position, either absolute or relative, of the robot arm with respect to a reference point. It is possible to use different reference points for each robot. Alternatively, different robots could use the same reference point to indicate their specific movements.

Once the start and stop point of a previous weld pass (n) has been identified by using the sensor, the control system can determine an adapted start point for a subsequent weld pass (n+1).

The method according to the present invention allows for avoiding so called start and stop defects. However, even if the start position of a subsequent weld pass (n+1) is at a distance of a start or stop point of a previous weld pass (n), when traveling from the start point to the stop point of the subsequent welding pass (n+1), the welding head will travel over either, the start point, the stop point or both of a previous welding pass (n). Due to the somewhat irregular profile of the start and stop points, welding defects could occur in case no specific measures were taken to compensate for this somewhat irregular profile of the workpiece at the mentioned start and stop points. These welding defects could comprise lack of side wall fusion or cold lap (lack of inter-run fusion).

In order to avoid welding defects when producing any subsequent welding pass (n+1) and when moving over a previous start and stop point according to the invention, a subsequent weld pass (n+1) is performed while using first welding parameters and boost welding parameters. A typical working process is as follows: In a first instance, a start point for a subsequent welding pass (n+1) is selected to be at least 10° offset from a previous start and stop point of a previous welding pass (n). Thereafter, first welding parameters are selected, wherein those first welding parameters take into account the characteristics of the workpiece and the type of weld that needs to be obtained. For the subsequent weld pass (n+1) any previous start and/or stop points are detected in the trajectory between the start point and the stop point of this subsequent welding pass (n+1). For each previous start point or stop point, a boost begin point is determined, which boost begin point is downstream from the start point for the subsequent welding pass (n+1) and is located upstream from said detected start point or stop point for the previous welding pass (n). According to an embodiment of the invention, the boost start point is 2° offset (upstream) of the said previous start point or stop point. According to an alternative embodiment of the invention, the boost start point is within 1°-3° offset (upstream) of the said previous start point or previous stop point.

In a next step, a boost end point is determined, wherein this boost end point is in the trajectory of the subsequent weld pass (n+1) and downstream from the detected previous start point or stop point of a previous welding pass (n). The boost end point is upstream from the stop point of the subsequent welding pass (n+1). According to an embodiment of the invention, the boost end point is 2° offset (downstream) from the said previous start point or previous stop point. According to a further embodiment of the invention, the boost end point is between 1°-3° (downstream) from the said previous start point or previous stop point. The interval between the boost begin point and the boost end point is referred to as the boost interval.

In yet a further step, boost welding parameters are determined wherein the boost parameters are adapted to be used for the weld pass between the boost begin point, upstream from the previous start point or previous stop point and the boost end point, downstream from the previous start point or previous stop point. According to the invention, the determined boost parameters are adapted to transfer an increased amount of heat to the workpiece, when compared to the first welding parameters. In practice, this may mean that when applying the boost welding parameters the distribution of the heat is amended to use a larger portion of the available heat for melting the workpiece.

The consequence of using first welding parameters in combination with boost parameters is, that for a subsequent weld pass (n+1) between the start point thereof and a boost begin point, first welding parameters are applied. Subsequently, between the boost begin point and the boost end point, boost welding parameters are applied. After the boost end point and towards a further boost interval or the stop point for the subsequent welding pass (n+1), first welding parameters are used. This means that in the area where the welding head 16 travels over the somewhat irregular profile of a previous start point or previous stop point, an increased amount of heat is available for melting the workpiece to thereby compensate for said somewhat irregular profile of the workpiece.

The technical effect of the use of, in a first place, a determined distance between a start point of a subsequent weld pass (n+1) and the start and stop point of a previous welding pass (n) in combination with the use of both first and boost welding parameters as described above is that a grinding operation of the workpiece prior to welding can be avoided.

It is well known in the prior art that such a grinding operation is usually required to smoothen the area around the start and stop points. To avoid the need for performing standard grinding operations, the control system of the robotic welding system 10 will trigger a pre-programmed tuned set of parameters to compensate for the somewhat irregular profile.

According to the invention, the boost welding parameters are adapted to allow an increased amount of heat to be transferred to the workpiece. This increase in heat can be obtained by altering the welding current and/or the welding voltage, altering the distance between the welding apparatus and the workpiece, altering the speed of supplying welding consumables towards the workpiece or altering the relative velocity of the welding head and the workpiece.

Alternatively, the welding head travel angle could be dynamically changed to accommodate the orientation of the profile to optimize the heat transferred to the workpiece. As such the welding arc would adapt the change of orientation of the weld profile so that the arc would be hitting the weld always perpendicularly.

Each of the above mentioned parameters can be used individually or in combination with one or more parameters to increase the heat transfer.

During the performance of the subsequent weld pass (n+1), the detection of the start and stop points of a previous weld pass (n) can be realized in several manners. According to a first embodiment of the invention, it is possible that the start and stop points of each previous weld pass (n) are stored in the memory of the control system of the robotic welding system 10. That means that once the weld path for the subsequent weld pass (n+1) is determined, the control system is able to identify the location of each previous start and stop point in the weld path of the subsequent weld pass (n+1). Therefore, the relevant boost begin points and the boost end points for each previous start and stop point can be calculated.

According to an alternative embodiment of the invention, the welding system 10 is provided with a sensor which is adapted to detect any previous start and stop point. A typical example of a sensor that can be used is a camera, wherein the camera is adapted to obtain images of the weld pass upstream from the welding head. Image processing of those images can allow the detection of any previous start and stop point. Instead of a camera a laser tracker could be used.

Now returning to the drawings, it is noted that upon initiation, the robot arm 14 moves the welding head 16 in a path appropriate for the subsequent weld pass (n+1). As previously mentioned, the path of the robotic welding system 10 is generally 180° or one half circumference of the cylindrical workpiece which is repeated for the second side of the workpiece. Following the second weld pass, an inquiry is made whether an additional weld pass is required for the current work station, as described in step 140.

In the FIGS. 10, 11, 12, 13, 14, 15, 16, 17 and 18 schematically and in cross section, examples are shown of welds obtained by means of the method and the system according to the invention.

Figure 10:
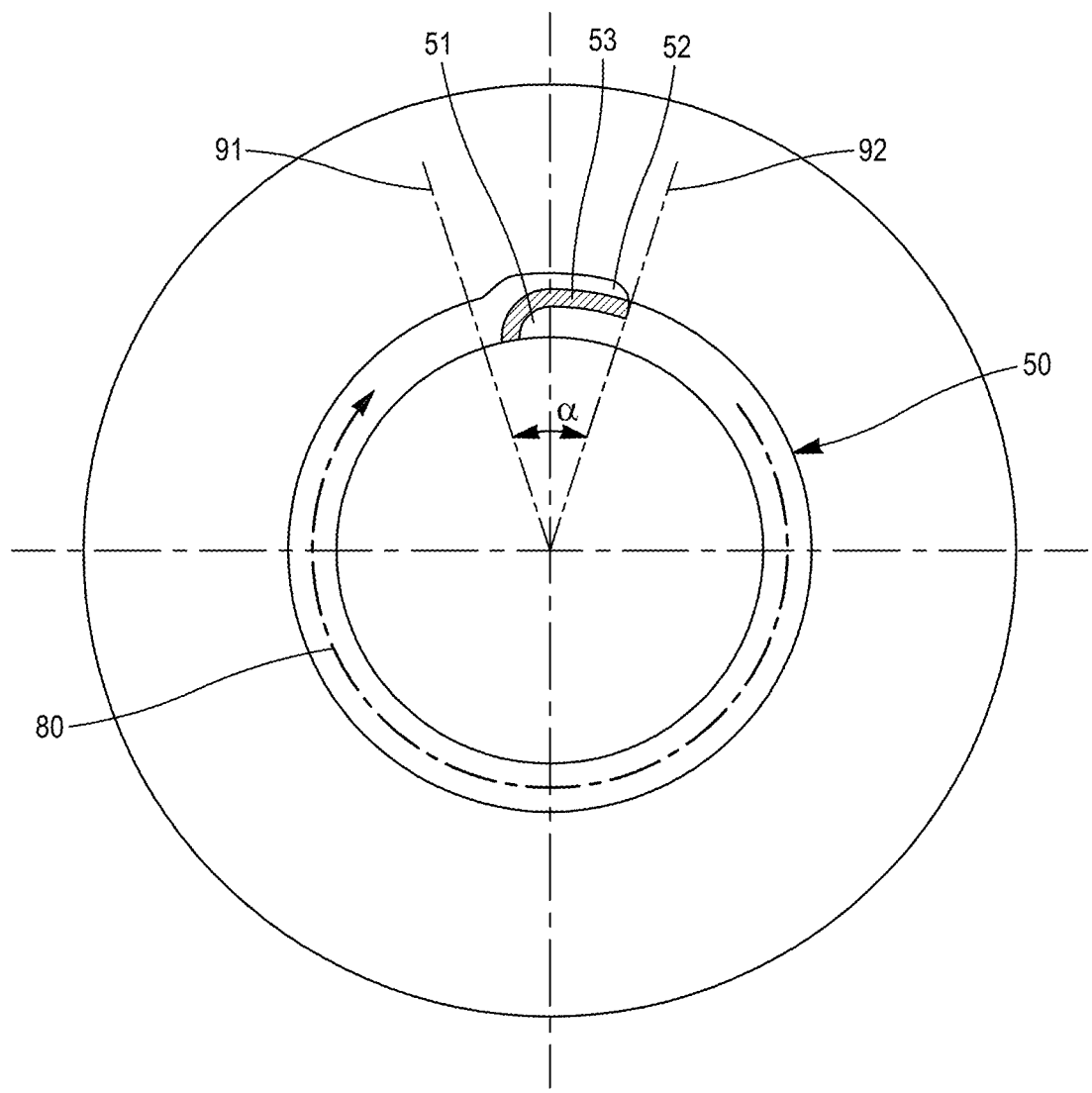
FIG. 10 shows schematically and in cross section, the example of welding a welding pass >360° by means of a single welding system on a workpiece.

In FIG. 10 the example is shown that a weld 50 is produced by means of a single welding system 10. The weld 50 extends, in the direction of the arrow 80, from a start point 51 to a stop point 52. The weld 50 extends over more than 360°. This means that the weld 50 comprises an overlap 53 which is shown in dashed lines. The overlap 53 is between the start point 51 of the weld 50 and a downstream part of the weld 50. In the example of FIG. 10, the overlap comprises the start point 51 and the stop point 52. During the welding operation for producing weld 50, first welding parameters are applied for the weld 50 from the start point 51 towards a downstream part of the weld. Once the welding system 10 arrives at the overlap 53, the first welding parameters are amended to boost welding parameters. These boost welding parameters are adapted to transfer an increased amount of heat to the workpiece. This means that an increased amount of heat is available for melting the workpiece, in particular the irregular surface of the start point 51 on top of which the remainder of the weld needs to be welded.

As shown in FIG. 10 by means of lines 91 and 92, the boost welding parameters are used in a boost area which includes the overlap 53. The boost area can start upstream of the overlap 53 and can end downstream of the overlap 53. As explained above, the boost area typically starts 1-3° upstream from the overlap 53 and typically ends 1-3° downstream from the overlap 53.

Figure 11:
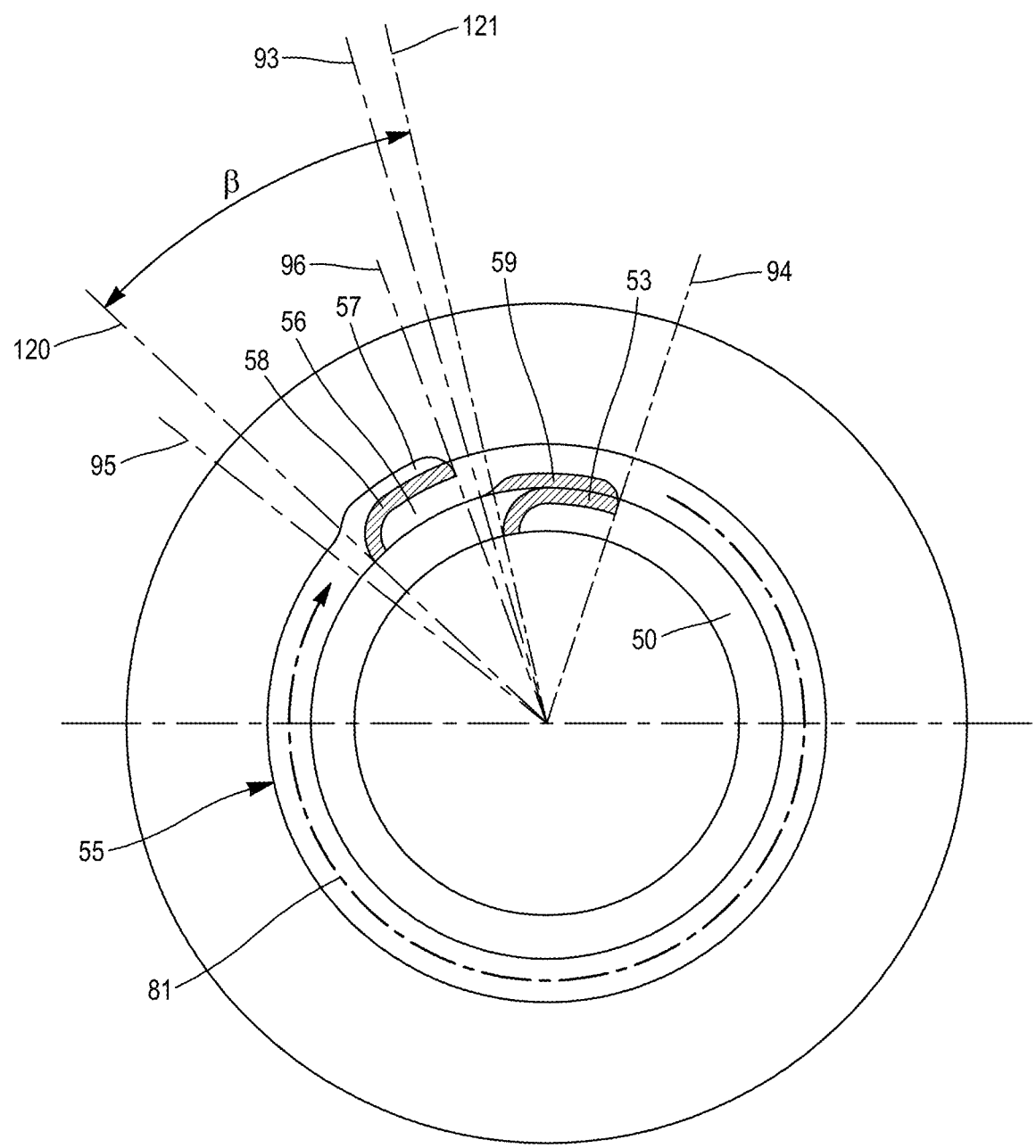
FIG. 11 shows schematically and in cross section, the example of welding a further weld (n+1)>360° by means of a single welding system, on top of the weld according to FIG. 10.

In FIG. 11, the weld 50 according to FIG. 10 is shown, with a further weld 55 being welded on top of weld 50. Weld 55 extends from a start point 56 to a stop point 57. Weld 55 is welded according to the direction indicated by arrow 81 from the start point 56 towards the stop point 57. The start point 56 has been selected to be offset from the stop point 52 of weld 50 (see FIG. 10). This means that the relatively irregular external surface of the workpiece at the stop point 52 can be avoided, when starting weld 55. This helps to avoid welding defects. The offset between the start point 56 of weld 55 and the stop point 52 of weld 50 will be, as explained above, in the interval between 10°-20°, preferably in the order of 10°. In FIG. 11 the interval for the offset between the start point 56 and the end point 52 is indicated by lines 120 and 121.

When welding weld 55 on top of weld 50, a first overlap area 59 will be present between the weld 55 and the overlap area 53 of weld 50. Prior to this area, the welding parameters will be amended from first welding parameters, used to weld the weld 55 from the start point 56 until the overlap are 59, to boost welding parameters adapted to weld the boost area including overlap area 59. The boundaries of the boost area are indicated with lines 93 and 94. As described above the boost area typically starts 1-3° upstream from the overlap 59 and typically ends 1-3° downstream from the overlap 59.

At the end of the boost area around overlap 59 the boost welding parameters are amended to return to the first welding parameters. These first welding parameters are used for welding weld 55 until the welding device 10 arrives at the boost area around the further overlap area 58. This overlap area 58 is the overlap between the start point 56 and the stop point 56 of weld 55. Prior to this area 58, the first welding parameters will be amended to boost welding parameters adapted to weld the boost area including overlap area 58. The boundaries of the boost area are indicated with lines 95 and 96. As described above the boost area typically starts 1-3° upstream from the overlap 58 and typically ends 1-3° downstream from the overlap 58.

Figure 12:
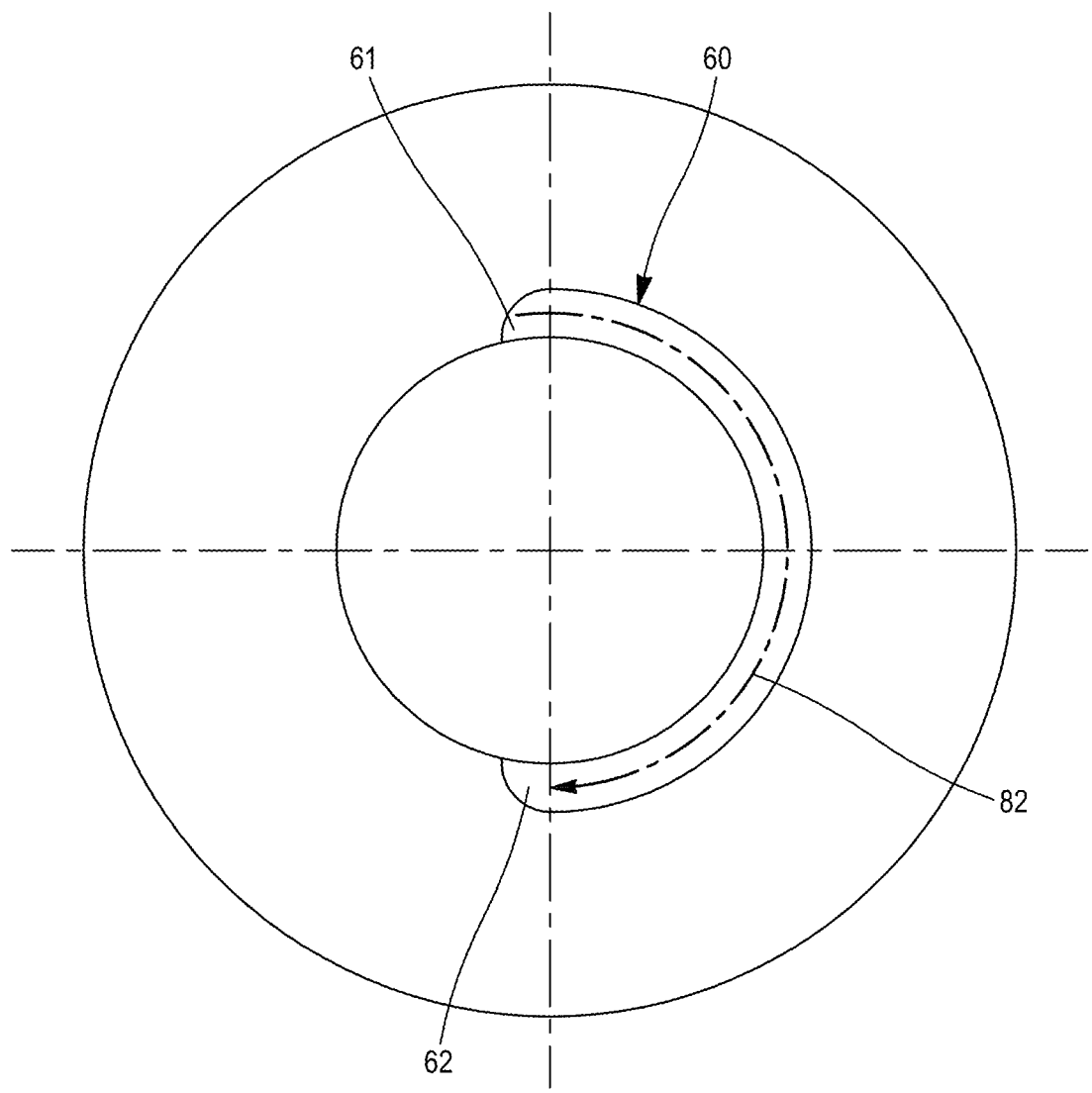
FIG. 12 shows schematically and in cross section, the example of welding a welding pass >180° by means of a single welding system on a workpiece.
Figure 13:
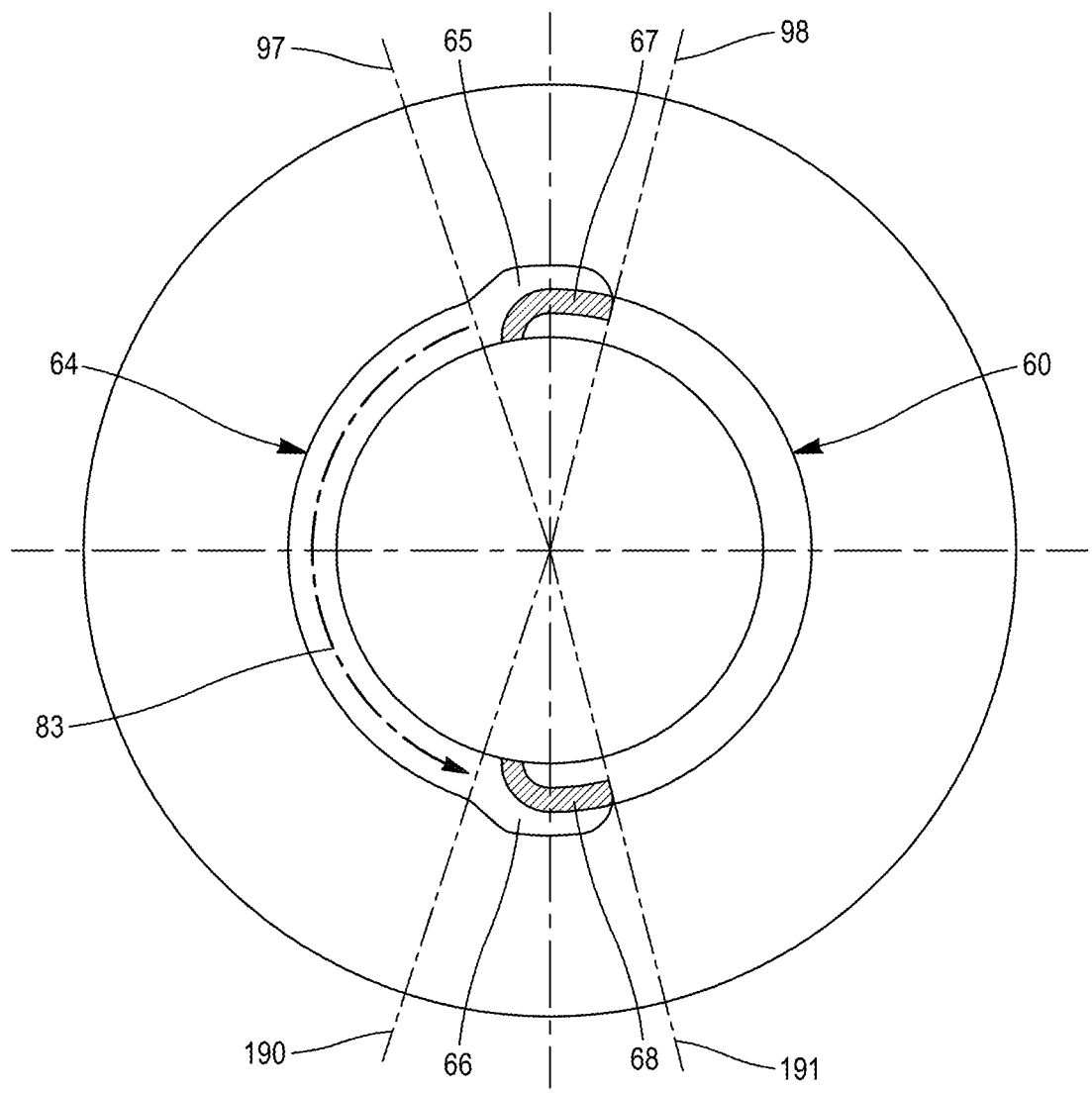
FIG. 13 shows schematically and in cross section, the example of welding a further weld (n+1)>180° by means of a single welding system, on top of the weld according to FIG. 12.
Figure 14:
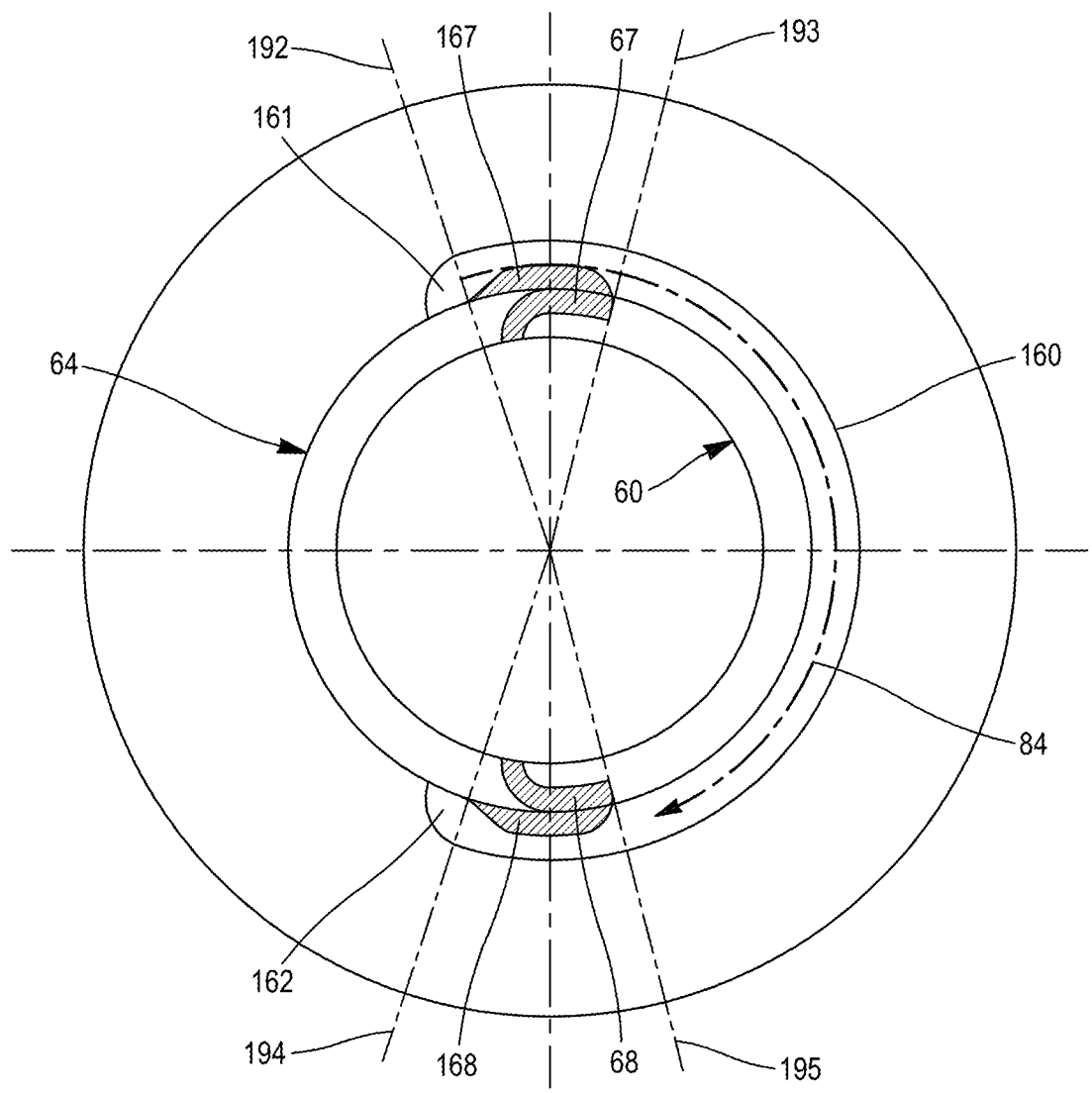
FIG. 14 shows schematically and in cross section, the example of welding yet a further weld (n+2)>180° by means of a single welding system, on top of the welds according to FIG. 13, FIGS. 15 and 16 show schematically and in cross section, the example of adjusting the relative angle between the welding head and the workpiece in case of a change in the surface geometry of the workpiece, to obtain a welding tension that matches set welding parameters.

FIGS. 12, 13 and 14 show further example for welding a first weld 60 on a workpiece, wherein weld 60 only covers part of the circumference of the workpiece. On top of the weld 60 (n) a further weld 64 (n+1) a further weld 160 (n+2) and yet a further weld 165 (n+3) is welded.

With reference to FIG. 12, the weld 60 extends in the direction of arrow 82 from a start point 61 towards a stop point 62. The weld 60 typically extends between the 12 o'clock and the 6 o'clock position.

With reference to FIG. 13, on the workpiece according to FIG. 12 a further weld 64 is welded, which overlaps with the weld 60. Weld 60 and weld 64 have a first overlap area 67 and a second overlap are 68. With lines 97 and 98 a boost area around the overlap area 67 is indicated. With lines 190 and 191 a boost area around the overlap area 68 is indicated. With reference to the description above, the weld 64 is welded using boost welding parameters inside the mentioned boost areas; first welding parameters are used outside the boost areas. The boost parameters are adapted, as explained in detail above, to transfer a more heat to the workpiece than the first welding parameters.

With reference to FIG. 14, on the workpiece according to FIG. 13 a further weld 160 is welded. Weld 160 is welded on top of welds 60 and 64. Weld 160 has two overlap areas 167, 168 with the underlying welds 60, 64 wherein weld 160 needs to be welded using boost welding parameters. A first overlap area 167 is present near the begin point 161 of weld 160. This overlap area 167 is between the weld 160 and the overlap area 67 (between welds 60 and 64). The second overlap area 168 is present near the end point 162 of weld 160. This overlap area 168 is between the weld 160 and the overlap area 66 (between welds 60 and 64). The respective boost areas associated with the overlap areas 167 and 168 are indicated with lines 192-193 and 194-195.

Figure 15:
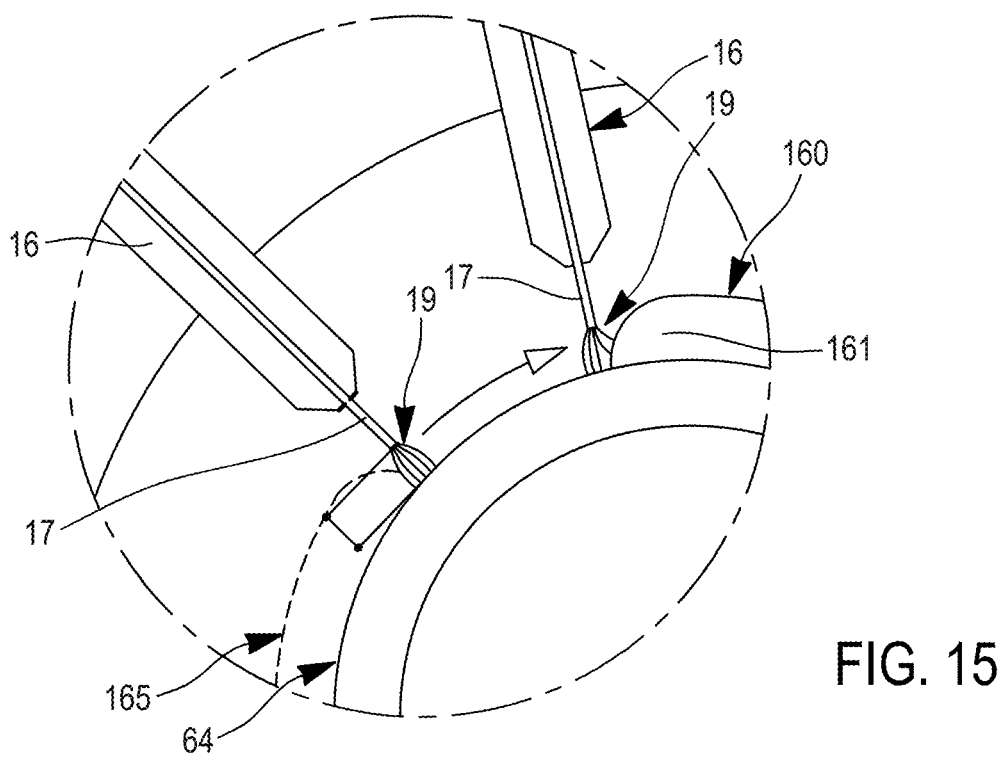
Figure 16:
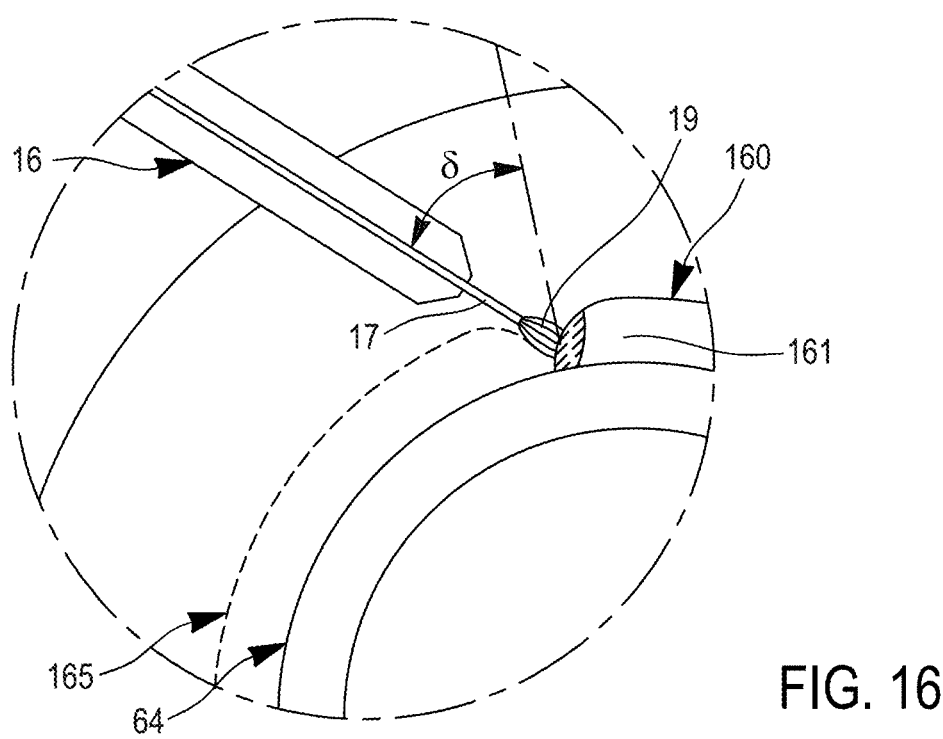

In FIGS. 15 and 16 an example is shown of the use of altering the relative position between the welding head 16 and the workpiece to thereby optimize the quality of the weld to be obtained.

In FIG. 15 the example is shown that on the workpiece according to FIG. 14 yet a further, weld 165 (n+3) is welded by means of the welding head 16. The weld 165 is schematically indicated by means of a dashed line. In order to obtain the weld 165 the welding head 16 and the welding wire 17, held within the welding head 16, are moved over the surface of the weld 64 (n+1) in the direction of the begin point 161 of the weld 160 (n+2).

In FIG. 15, the welding head 16 is shown in a first position (left in FIG. 15) and a second position (right in FIG. 15), wherein the arrow between the two positions indicates the direction of movement of the welding head 16 during the production of the weld 165.

FIG. 15 shows that, in the second position of the welding head 16, the leading end of the arc 19 hits the protruding begin point 161 of the weld 160. This means that, at the leading end of the arc 19, the distance between tip of the welding wire 17 and the surface of the workpiece is shortened and therefore the welding tension will drop. The welding system 10, of which the welding head 16 is part, comprises means adapted to measure this drop in the welding tension. In order to correct for this drop in welding tension, the relative angle between the welding head 16 and the surface of the workpiece is adjusted. This is shown in FIG. 16.

In FIG. 16 the welding head 16 and the workpiece according to FIG. 15 are shown, after the adjustment of the relative angle between the welding head 16 and the workpiece. As shown in FIG. 16, the welding head 16 is rotated over an angle δ in order to position the welding head 16, and thereby the welding wire 17, in an angular position essentially in line with the normal of the surface of the workpiece. In the position according to FIG. 16, the welding wire 17 will be forwarded towards the workpiece in a direction substantially perpendicular to the surface of the workpiece.

The effect of the above mentioned adjustment of the angular position of the welding head 16 with respect to the workpiece is that a welding tension is reobtained which matches the set welding parameters.

Figure 17:
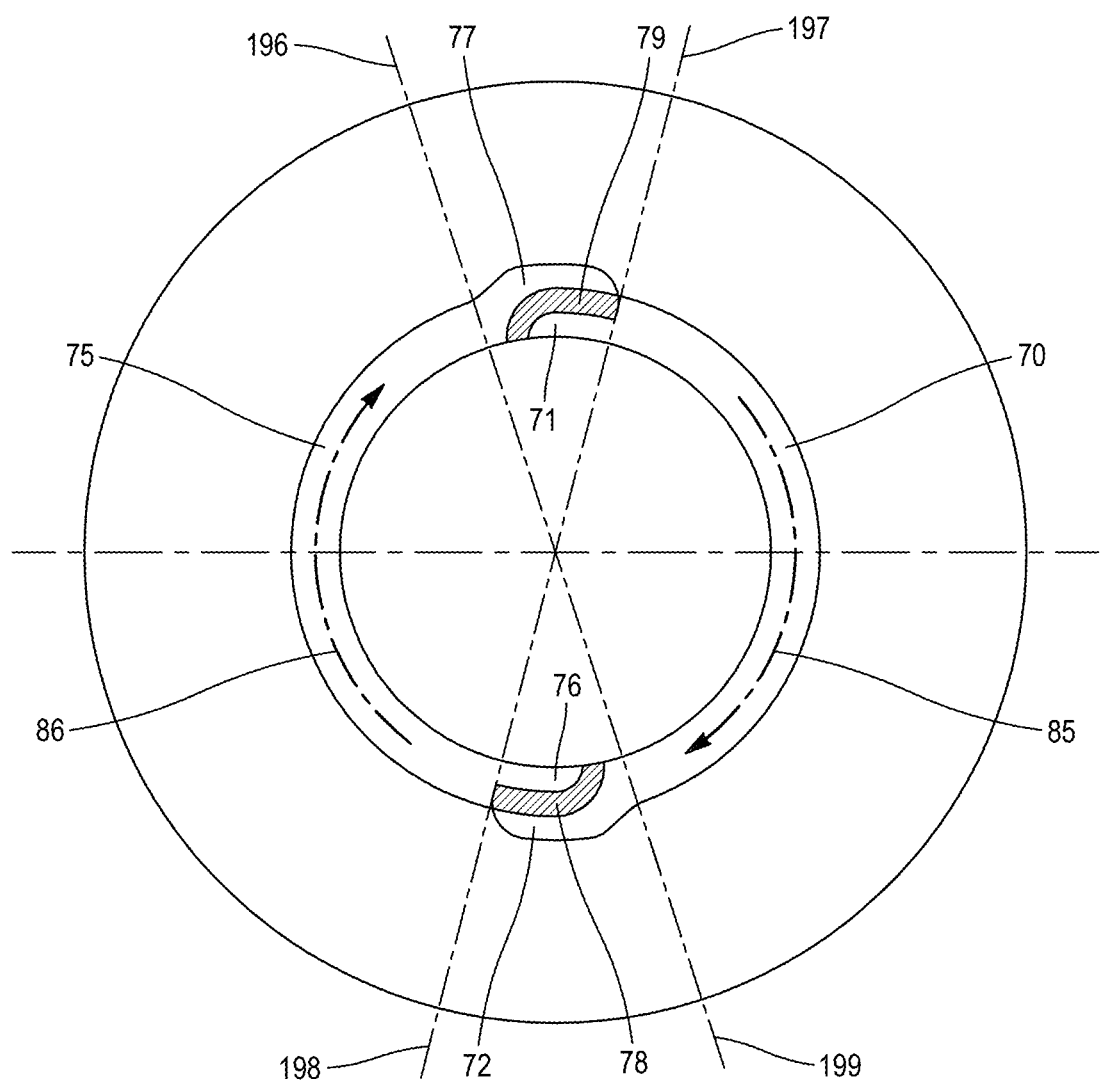
FIG. 17 shows schematically and in cross section, the example of simultaneously welding two welds >180° by means of a first and second welding system, on top of a workpiece the weld according to FIG. 12.
Figure 18:
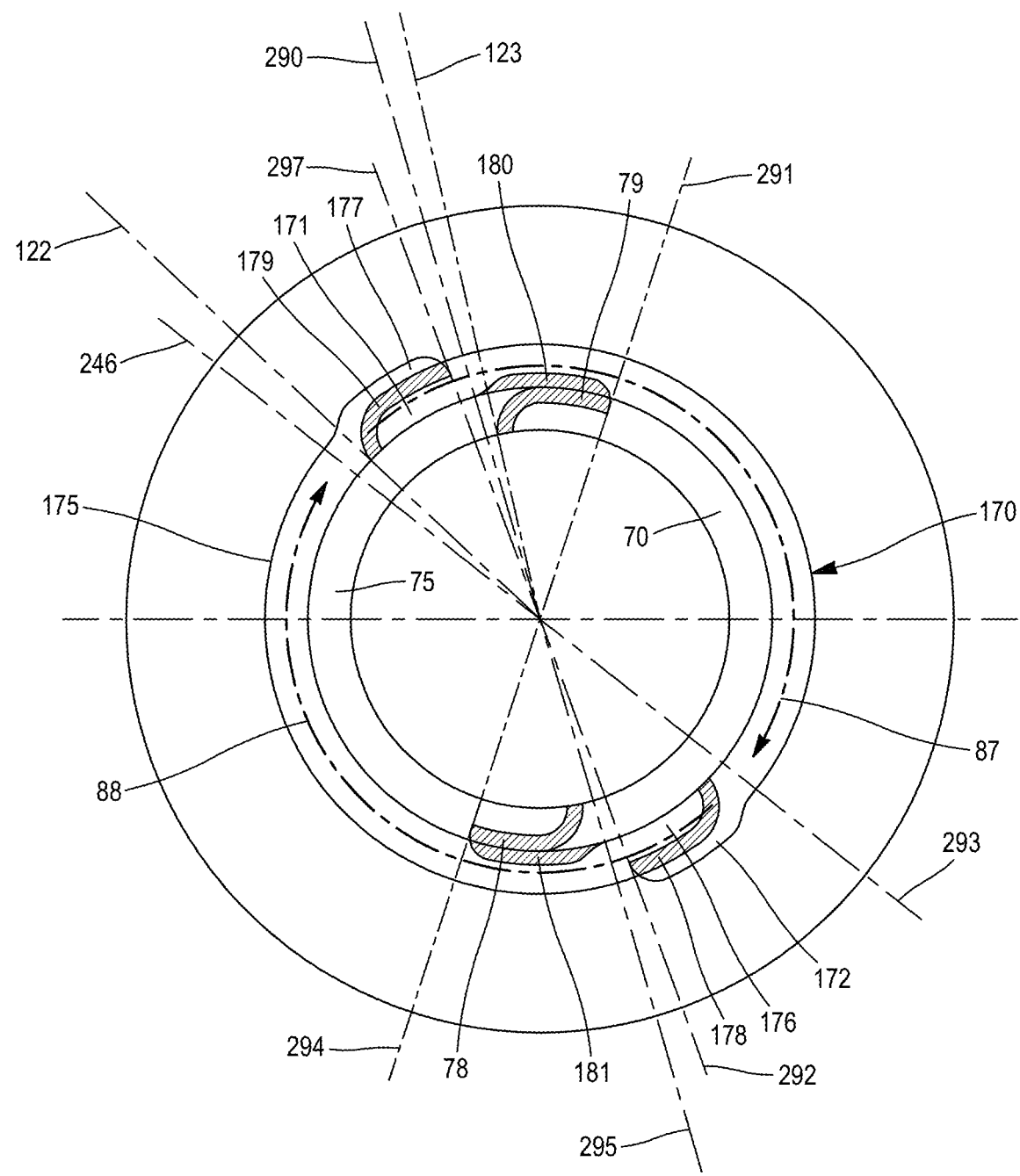
FIG. 18 shows schematically and in cross section, the example of simultaneously welding two further welds (n+1) >180° by means of a first and second welding system, on top of the welds according to FIG. 17.

In FIGS. 17 and 18 the example is shown wherein circumferential welds are obtained using a first and a second welding system. In FIG. 17, schematically, a first weld 70 and a second weld 75 are shown in cross section. Weld 70 is welded from a start point 71 to a stop point 72 in the direction of the arrow 85. Simultaneously, weld 75 is welded between the start point 76 and the stop point thereof. Both welds 70, 75 will be welded using first welding parameters from the start point towards the stop point of the weld. As shown in FIG. 17, the weld 70, 75 have two overlap areas 78 and 79. In FIG. 17 the boost area around overlap 78 is indicated with lines 198 and 199. The limitations of the boost area around the overlap area 78 are indicated with lines 196 and 197. The welds 70 and 75 will be welded inside the respective boost areas using boost welding parameters, adapted to transfer an increased level of heat to the workpiece when compared with the first welding parameters.

In FIG. 18 the work piece according to FIG. 17 is shown, wherein welds 170 and 171 are welded on top of the welds 70, 71. Weld 170 is welded from a start point 171 to a stop point 172 in the direction of the arrow 85. Simultaneously, weld 175 is welded between the start point 176 and the stop point thereof. Both welds 170, 175 will be welded using first welding parameters from the begin point towards the stop point of the weld. As shown in FIG. 17, the welds 170, 175 have two overlap areas 180 and 181 with an endpoint of respectively weld 70 and 75. Furthermore, welds 170, 175 have two overlap areas 178 and 179 near their respective end points. The boost area around the four overlap areas 178, 179, 180 and 181 are indicated with lines 290-291, 292-293, 294-295 and 296-297. The welds 170 and 175 will be welded using first welding parameters outside said respective boost areas and using boost welding parameters, adapted to transfer an increased level of heat to the workpiece when compared with the first welding parameters, inside the boost areas.

FIG. 18 further shows that the start point 171 for weld 170 and the start point 176 for weld 175 have been selected to be offset from the overlap areas 78 and 79. The offset between the start point 171 of weld 170 and the overlap area 79 will be, as explained above, in the interval between 10°-20°, preferably in the order of 10°. In FIG. 18 the interval for the offset between the start point 171 and the overlap area 79 is indicated by lines 122 and 123. The start point 176 is selected in similar fashion with respect to overlap are 78.

Implementation of the robot cylindrical welding processes of the present application results in an improved process capability with an increased welding performance. In comparison to other fixed cylindrical workpiece welding applications a robotic welding system can significantly reduce the non-value added activity times or idle times, including but not limited to grinding operations. The robot system can also offer higher position accuracies and repeatability. In many applications, reliability of the welding process execution is improved.

Turning to FIGS. 6A, 6B, and 6C, depicted is a robotic welding system 10 incorporating a plurality of workpiece supports 30. This design permits the robot arm to improve the efficiency of its work processes by removing idle time once one workpiece has been welded and then must be removed prior to a next welding operation. By using multiple workpiece supports 30, once welding of a first workpiece 20 is completed, the robot arm 14 moves to weld another workpiece 21 or 22. Though not shown, the different workpieces may differ in size or shape.

With continuing attention to FIGS. 1A, 1B, 10, 2, 3, 4, 5, 6A, 6B, 6C, 7A, 7B, and 8, the robotic welding system has been constructed to incorporate pedestals (e.g., 34 of FIG. 1A) such that the robotic welding system is a set distance above the ground. Thanks to this design it is possible to weld around all the workpiece circumferential positions. For some robotic welding systems (e.g., 14 of FIG. 1A), the robot arm may be oriented upright on a pedestal. For other robotic welding system applications, the robot work space may be improved by utilizing a vertical or angled wall mount (e.g., 14 of FIG. 3) or ceiling mount configuration (e.g. 14 of FIG. 4).

Additionally, in the case of vertical or near vertical oriented cylindrical workpieces a rotating floor in which the robotic welding system(s) is mounted may be used to improve the welding performance. This is shown in FIG. 8. For example, during J-Lay pipeline installation involving pipe welding on an offshore vessel, a rotating platform 11 may reduce the number of welding starts and stops; thus, reducing idle time and improving overall productivity and vessel efficiency.

Cylindrical workpieces as small as one inch in diameter have been welded using this process, and the upper diameter limit would appear to only be limited by the physical size of the used robotic welding system.

Through use of the present system, including the ability to create and implement a variety of workflow programs for cylindrical welding, it becomes economical to use a robotic welding system to weld single pieces as well as large runs of the similar-sized pieces.

The invention has been described with reference to a preferred embodiment and alternatives thereof. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

The invention claimed is:

1. A method for automated circumferential welding of a workpiece by means of at least one welding device, comprising the steps of:
   a) determining a further weld path for a further weld to be welded on the workpiece, the further weld extending from a start point, via a downstream part to a stop point,
   b) determining first welding parameters associated with said further weld and adapted to weld said further weld on the workpiece, wherein the first welding parameters are adapted to transfer a first level of heat to the workpiece, c) identifying at least one overlap area in the further weld path between the downstream part and the start point of said further weld or between said further weld and a start or stop point of a previous weld, d) determining a boost area, said boost area comprising said at least one overlap area, e) determining boost welding parameters associated with said boost area and adapted to weld said further weld in said boost area, wherein the boost welding parameters are adapted to transfer a second level of heat to the workpiece, the second level of heat exceeding the first level of heat, and f) welding the further weld from the start point to the stop point thereof, wherein the first welding parameters are selected for welding of the further weld outside said boost area, and wherein the boost welding parameters are selected for welding the further weld inside said boost area.

2. The method according to claim 1, further comprising the step of:

g) identifying a second overlap area in the further weld path between the downstream part and the start point of said further weld or between said further weld and a start or stop point of a previous weld, wherein said boost area comprises said second overlap area.

3. The method according to claim 1, wherein determining a further weld path for a further weld to be welded on the workpiece, comprises the steps:

h) identifying the position of the start point and/or the stop point of a previous weld on the workpiece, and i) selecting the start point for the further weld to be offset from the start and/or stop point of said previous weld on the workpiece.

4. The method according to claim 3, wherein determining a further weld path for a further weld to be welded on the workpiece further comprises the step of:

j) selecting the stop point for the further weld to be offset from the start and/or stop point of said previous weld on the workpiece.

5. The method according to claim 3, wherein said start point for the further weld is selected to be in the interval of 5°-15°, preferably 10°, offset from respectively the start point or the stop point of said previous weld.

6. The method according to claim 1, wherein determining a boost area comprises the step of:

k) determining a boost begin point upstream from said at least one overlap area in the weld path for the further weld.

7. The method according to claim 6, wherein determining a boost area further comprises the step of:

l) determining a boost end point downstream from said at least one overlap area in the weld path for the further weld.

8. The method according to claim 6, wherein the boost begin point is selected to be in the interval of 1°-3°, preferably 2°, upstream from said at least one overlap area.

9. The method according to claim 7, wherein the boost end point is selected to be in the interval of 1°-3°, preferably 2°, downstream from said at least one overlap area.

10. The method according to claim 1, wherein the method is performed by using a welding device comprising a control system with a memory, and wherein identifying at least one overlap area comprises the steps of:

m) storing in the memory of the control system the position of the start point and the stop point of a previous weld, n) storing in the memory of the control system the determined weld path for the further weld, o) using the control system to compare the position of the start point and the stop point of the previous weld with the determined weld path for the further weld, and p) using the result of the comparison of o) to determine the position of the start point and/or stop point of the previous weld within the further weld path to thereby identify the at least one overlap area.

11. The method according to claim 1, wherein identifying at least one overlap area in the further weld path between the start point of said further weld and a downstream part of said further weld or between a start or stop point of a previous weld and a part of said further weld comprises the steps of:

q) providing the welding device with a sensor adapted to obtain, during welding, information relating the weld path upstream from the welding device, and r) analysing the information obtained in q) to identify the presence of a start point and/or the stop point of a previous weld in the weld path for the further weld.

12. The method according to claim 11, wherein the method comprises the steps of:

s) providing the welding device with a camera adapted to obtain images of the weld path upstream from the welding device, t) performing image processing of the obtained images obtained in s), and u) using the results of the image processing of t) to determine the position of a start point and/or a stop point of a previous weld in the weld path for the further weld.

13. The method according to claim 1, wherein the first welding parameters comprise at least a first welding power and wherein determining boost welding parameters comprises the step of:

v) obtaining boost power parameters to allow an increased transfer of heat to the workpiece during welding using the boost welding parameters compared to welding using the first welding parameters.

14. The method according to claim 1, wherein the first welding parameters comprise at least a first angular orientation of the welding device with respect to the work piece and wherein determining boost welding parameters for the boost interval comprises the step of:

w) obtaining a boosted angular orientation of the welding head with respect to the work piece to allow an increased transfer of heat to the workpiece during welding using said boosted angular orientation compared to welding using the first welding parameters.

15. The method according to claim 1, wherein the method comprises: repeating steps a)-f) to obtain a subsequent weld.

16. A computer program product comprising a computer-readable storage medium having encoded thereon computer-readable instructions, which, when executed by a computer, cause the computer to perform each of the method steps of claim 1.

* * * * *